(12) United States Patent
Takahashi et al.

(10) Patent No.: US 8,014,746 B2
(45) Date of Patent: Sep. 6, 2011

(54) EXTERNAL REQUEST TYPE FUNCTION CONTROL SYSTEM, TERMINAL DEVICE, EXTERNAL REQUEST TYPE FUNCTION CONTROL METHOD, AND EXTERNAL REQUEST TYPE FUNCTION CONTROL PROGRAM

(75) Inventors: Mie Takahashi, Tokyo (JP); Tomoharu Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/966,910

(22) Filed: Dec. 13, 2010

(65) Prior Publication Data

US 2011/0087752 A1 Apr. 14, 2011

Related U.S. Application Data

(62) Division of application No. 11/570,677, filed as application No. PCT/JP2005/010762 on Jun. 13, 2005, now Pat. No. 7,904,051.

(30) Foreign Application Priority Data

Jun. 14, 2004 (JP) ................................. 2004-175191

(51) Int. Cl.
*H04W 88/02* (2009.01)
(52) U.S. Cl. ........................................ 455/327; 455/438
(58) Field of Classification Search .................. 455/327, 455/438
See application file for complete search history.

(56) References Cited

U.S. PATENT DOCUMENTS

| 5,742,624 | A | 4/1998 | Irie et al. | |
|---|---|---|---|---|
| 5,930,523 | A * | 7/1999 | Kawasaki et al. | ................ 712/32 |
| 6,622,043 | B1 * | 9/2003 | Kraus et al. | ..................... 607/27 |
| 6,693,395 | B2 * | 2/2004 | Wilhelm | ....................... 315/291 |
| 7,471,644 | B2 | 12/2008 | Sakai | |
| 2006/0135114 | A1 | 6/2006 | Sakai | |
| 2010/0165072 | A1 | 7/2010 | Oike | |

FOREIGN PATENT DOCUMENTS

| JP | 10-276475 | 10/1998 |
|---|---|---|
| JP | 11-331948 | 11/1999 |
| JP | 2001-326962 | 11/2001 |
| JP | 2002-27554 | 1/2002 |
| JP | 2002-95044 | 3/2002 |
| JP | 2002-262355 | 9/2002 |
| JP | 2002-320270 | 10/2002 |
| JP | 2003-229872 | 8/2003 |
| JP | 2004-23692 | 1/2004 |
| JP | 2004-159073 | 6/2004 |

\* cited by examiner

*Primary Examiner* — Diane Mizrahi
(74) *Attorney, Agent, or Firm* — Dickstein Shapiro LLP

(57) ABSTRACT

A function control information transmitter 30 transmits function control information 40 for controlling the function of a terminal device 10 such as a mobile telephone. When the terminal device (mobile telephone 10) receives the function control information 40 from the function control information transmitter 30, the terminal device analyzes the received function control information 40 so as to control the function of the control object even without preparing in advance a correspondence table for controlling the function. Thus, it is possible to easily use the optimal function, application software, and a service in accordance the environment and the situation.

7 Claims, 22 Drawing Sheets

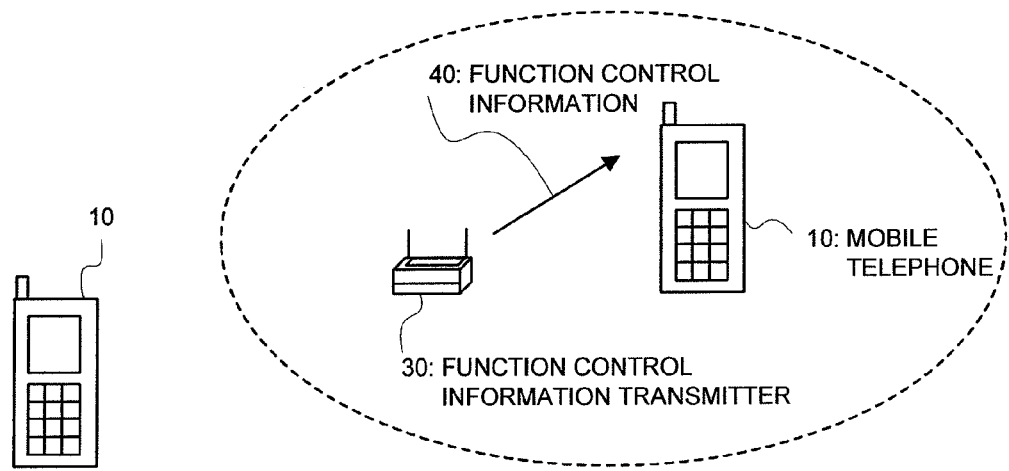
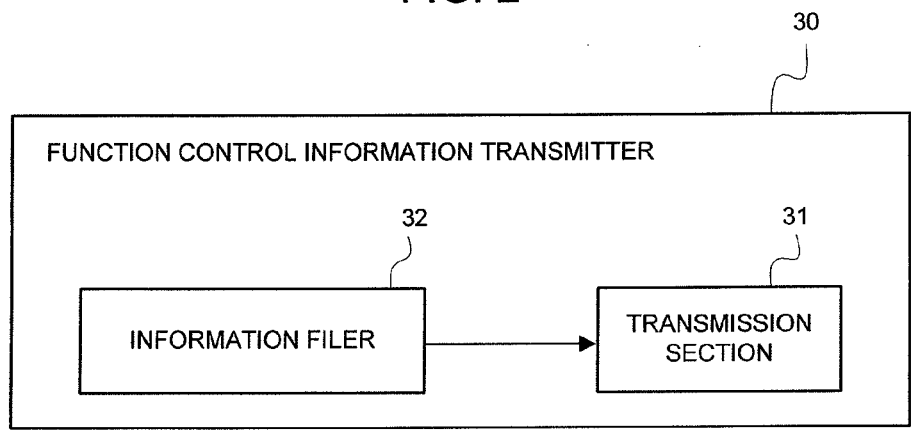
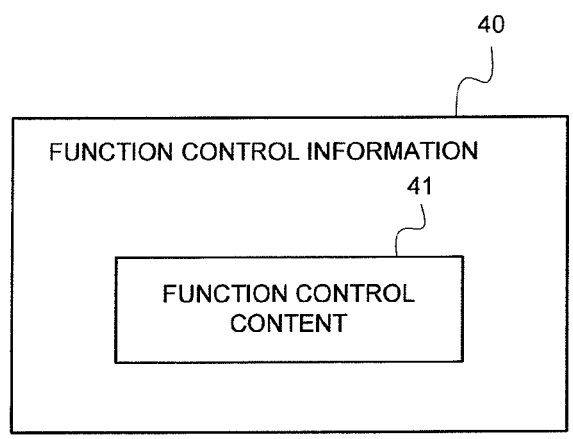

FIG. 27

| FUNCTION CONTROL INFORMATION | CREDIT INFORMATION | CONDITION | EVALUATION INFORMATION | PRIORITY DEGREE | COMPULSORY FORCE | FUNCTION CONTROL CONTENT | CANCELLATION INFORMATION | ICON INFORMATION |
|---|---|---|---|---|---|---|---|---|
| 40-a | ○○MOVIE THEATER SHA1/RSA SIGNATURE | NON-SETTING OF MANNER MODE | HIGH | LOW | NORMAL | SETTING MANNER MODE RECORDING EXECUTION OF FUNCTION CONTROL INFORMATION 40-a | AFTER FOUR HOURS | ○○MOVIE THEATER a |
| 40-b | ○○MOVIE THEATER SHA1/RSA SIGNATURE | ELECTRONIC TICKET APPLICATION EXISTS | LOW | LOW | NORMAL | STARTING ELECTRONIC TICKET APPLICATION | FUNCTION CONTROL INFORMATION 40-b HAS NOT BEEN RECEIVED | ○○MOVIE THEATER b |
| 40-c | ○○MOVIE THEATER SHA1/RSA SIGNATURE | — | HIGH | HIGH | COMPULSORY | PROHIBITING CAMERA PHOTOGRAPHING NON-LIGHTING OF BACKLIGHT OF LIQUID CRYSTAL SETTING MANNER MODE | FUNCTION CONTROL INFORMATION 40-c HAS NOT BEEN RECEIVED | ○○MOVIE THEATER c |
| 40-d | △△STAND SHA1/RSA SIGNATURE | APPLICATION FOR SETTLING ACCOUNT EXISTS | LOW | LOW | NORMAL | STARTING APPLICATION FOR SETTLING ACCOUNT | FUNCTION CONTROL INFORMATION 40-d HAS NOT BEEN RECEIVED | △△STAND d |
| 40-e | ○○MOVIE THEATER SHA1/RSA SIGNATURE | EXECUTING FUNCTION CONTROL INFORMATION 40-a | HIGH | HIGH | COMPULSORY | CANCELLING MANNER MODE ERASING EXECUTION RECORD OF FUNCTION CONTROL INFORMATION 40-a DISTRIBUTING DISCOUNT TICKET FOR NEXT-TIME MOVIE SHOW | FUNCTION CONTROL INFORMATION 40-e HAS NOT BEEN RECEIVED | ○○MOVIE THEATER e |

EXTERNAL REQUEST TYPE FUNCTION CONTROL SYSTEM, TERMINAL DEVICE, EXTERNAL REQUEST TYPE FUNCTION CONTROL METHOD, AND EXTERNAL REQUEST TYPE FUNCTION CONTROL PROGRAM

CROSS REFERENCE TO RELATED APPLICATIONS

This application is a Divisional of U.S. patent application Ser. No. 11/570,677 filed Dec. 14, 2006, which claims priority to Japanese Patent Application No. 2004-175191, filed Jun. 14, 2004, the contents of all of these applications are hereby incorporated by reference herein.

APPLICABLE FIELD IN THE INDUSTRY

The present invention relates to an external request type function control system, a terminal device, an external request type function control method, and an external request type function control program that accept function control information by employing means other than a user's operation, and operate.

BACKGROUND ART

The progress in a high functionality of a terminal device gives rise to the state that a user cannot master necessary functions, application software, and a service fully. So as to solve such a problem, it is thinkable to take the control such as starting of and setting a limit to a function of the terminal device and an application program from the outside, and providing the service. For example, the mobile communication system that enables a service provider side to set a limit to use of a mobile terminal is described in Patent document 1. In the mobile communication system described in the Patent document 1, a server acquires positional information of the terminal device, and determines the function, application software, and a service caused to correspond to its acquired position. And, the server transmits a control command based upon its determination to the terminal device, thereby to take the control such as setting a limit to the function of the terminal device and providing the application software and the service.

Further, in Patent document 2 is described the photographing-limit system in which a transmitter for control is mounted in a location requiring a functional limit to the terminal device, a signal for setting a limit to the function is transmitted, and the terminal device having received a limit signal executes the functional limit described in the control signal. Further, in Patent document 3 is described the external control technique of the mobile terminal in which the terminal device receives a control signal and retains it in a memory, and reads out the limit control retained in the memory to execute the functional limit at the time of not performing a process such as a public telephone call.

Further, in Patent document 4 is described the communication system in which a communication function limit device is mounted in a location requiring the functional limit to the terminal device to transmit information specifying a limit level, and the terminal device having received the limit information sets the functional limit automatically responding to the limit level pre-stored in the inside thereof. Further, in Patent document 5 is described the communication apparatus that enables the service to be easily used by making a configuration so that by employing short-distance communication means such as an IC card, an owner of the terminal device automatically can install the setting that the terminal device side has to make in order to make a connection with an access point of a wireless LAN or a printer.

[Patent document 1] JP-P1998-276475A (paragraph 0008 to 0016)

[Patent document 2] JP-P2004-23692A (paragraph 0021 to 0055, FIG. 1 to FIG. 4)

[Patent document 3] JP-P2001-326962A (paragraph 0016 to 0024, FIG. 1 to FIG. 4)

[Patent document 4] JP-P1999-331948A (paragraph 0007 to 0016)

[Patent document 5] JP-P2003-229872A (paragraph 0010 to 0031)

DISCLOSURE OF THE INVENTION

Problems to be Solved by the Invention

The mobile communication system described in the Patent document 1 necessitates a server system that is capable of acquiring positional information and yet transmitting a command to a mobile appliance. For this, the method of utilizing a base station like the case of the mobile communication system described in the Patent document 1 necessitates a large-scale system. Further, an enterpriser capable of employing and controlling such a larger-scale system is confined to a mobile telephone company etc.

Further, in the photographing-limit system described in the Patent document 2 and the external control technique described in the Patent document 3, it is impossible to determine executability of the function control specified by the limit signal based upon the current operational state of the function, being a control object, of the terminal device. For this, the method of receiving the limit signal, thereby to execute the functional limit like the case of the photographing-limit system described in the Patent document 2 might incur a user's convenience when the functional limit is executed during execution of some process. Further, in the method of receiving the limit signal to retain it, and reading out the limit signal to execute the functional limit at the time of performing no process like the case of the external control technique described in the Patent document 3, it is impossible to take the function control while the terminal device performs the process.

Further, in the communication system described in the Patent document 4, the terminal device has to pre-store a rule etc. for specifying the limit level. For this, the method of causing the terminal to pre-store the control method like the case of the communication system described in the Patent document 4 allows a variation of the correspondable functional limit to be restricted.

Further, in the communication apparatus described in the Patent document 5, the owner of the appliance grasps the available service, and performs an action of holding up the IC card over a reader, or the like. However, in a case where the owner of the appliance has not grasped whether or not the available service exists, the owner cannot find the service because the owner performs no action at all. For this, in the method of accompanying an action of the owner of the appliance like the case of the communication apparatus described in the Patent document 5, the owner cannot utilize the service of which the owner itself is not aware.

Further, the systems shown in the Patent document 1, the Patent document 4 and the Patent document 5 allow the function control from the outside to disturb a user' operation that is currently active in some cases. Further, in the systems shown in the Patent document 1 to the Patent document 5, the function control signal, which is a malicious signal causing a wrong operation of the terminal device to be triggered, or a signal assuming a false sender, allows the function control to be taken in some cases. Further, in the systems shown in the Patent document 1 to the Patent document 5, it is impossible to control only a specific terminal device because all of the terminal devices having received the function control signal result in being function-controlled. Further, in the systems shown in the Patent document 1 to the Patent document 5, it is impossible to automatically execute the function control by the received function control signal in some cases, and to execute only the function control permitted by the user in some cases. Further, the systems shown in the Patent document 1 to the Patent document 5, which have not expected the case of having received a plurality of the function control signals, cannot control the function sometimes in the case of having received a plurality of the control signals for one function.

Thereupon, the present invention has an object of providing an external request type function control system, a terminal device, an external request type function control method, and an external request type function control program that enable the optimum function, application software, and a service to be easily used in accordance with the environment and the situation by starting the terminal device with the means other than the user's operation.

Means to Solve the Problem

The external request type function control system in accordance with the present invention, which includes a terminal device (which is realized by means of a mobile telephone 10) and a function control information transmitting device (which is realized by means of a function control information transmitter 30) for transmitting function control information including an instruction for controlling a function of the terminal device, is characterized in that the terminal device includes: reception means (which is realized by means of a reception section 11) for receiving the function control information from the function control information transmitting device; monitoring means (which is realized by means of a monitor 13 and a storage section 20) for monitoring a state of the function that could be specified in the function control information, determination means (which is realized by means of an adjuster 12) for, based upon a monitoring result by the monitoring means, determining whether or not the function specified in the function control information received by the reception means is controllable, and determining whether a control of the function indicated by the function control information is executable; and function control means (which is realized by means of a function controller 14 and a function section 15) for, based upon a determination by the determination means, executing the control of the function specified by the function control information. Additionally, the so-called "to control a function of a terminal device" signifies taking a control, for example, by automatically switching off an electric source of the terminal device in some cases, and by automatically setting a mode of the terminal device to a manner mode in some cases. Further, the so-called "to monitor a state of a function" signifies grasping a state of a function, for example, by causing the storage section to store information as to which kind of the function the terminal device currently includes in some cases, and by causing the storage section to store the state etc. as to whether or not each function of the terminal device is currently being executed.

The terminal device in accordance with the present invention, characterized in including reception means for receiving function control information including an instruction for controlling a function of the terminal device that an external function control information transmitting device of the terminal device transmits; monitoring means for monitoring a state of the function that could be specified in the function control information; determination means for, based upon a monitoring result by the monitoring means, determining whether or not the function specified in the function control information received by the reception means is controllable, and determining whether a control of the function indicated by the function control information is executable; and function control means for, based upon a determination by the determination means, executing the control of the function specified in the function control information. Such a configuration, which does not necessitate a large-scale system employing a base station, makes it possible to control the function of the terminal device in some cases, and to provide the service in some cases in conformity with the environment, the location and the situation from the outside of the terminal device even though the terminal device is not caused to pre-store the control content, and yet the user of the terminal device is not aware of the function.

Further, the monitoring means may be means for storing a control source, being a cause of having changed a state of the function into a current state, and the determination means may be means for comparing a priority degree of the current control source of the function specified in the function control information, which is stored by the monitoring means, with a priority degree that is included in the function control information, thereby to determine whether or not the function control by the function control information is executable. Such a configuration makes it possible to take the function control of the terminal device by the function control information from the outside without disturbing the function that is currently being activated by the user's operation etc.

Further, the terminal device may include credibility determination means (which is realized by means of a credibility confirmer 16) for determining whether or not the function control information transmitting device, being a transmission source that has transmitted the function control information, and a transmission source described in the function control information coincide with each other, and determining existence of tampering of the function control information. Such a configuration makes it possible to prevent the function control by a function control signal bearing malice, a function control signal assuming a false sender, etc.

Further, the terminal device may include condition determination means (which is realized by means of a situation analyzer 17) for determining whether or not a state of the terminal device meets a condition under which the function control described in the function control information is executed. Such a configuration makes it possible to control only the function of the terminal device having met the condition, out of the functions of the terminal device having received the function control information.

Further, the condition determination means may be means for, based upon evaluation information described in the function control information, determining whether or not a permission for executing the function control is requested of the user of the terminal device. Such a configuration makes it possible to automatically execute the function control described in the function control information in some cases, and to execute only the function control permitted by user in some cases.

Further, the condition determination means may be means for, in a case where the reception means has received plural kinds of the function control information, deciding an order in which a function control process is executed based upon evaluation information described in the function control information. Such a configuration makes it possible to antecedently take the control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

Further, the terminal device may include storage means (which is realized by means of a storage section 20) for pre-storing an execution order of the controllable function, and the determination means may be means for, in a case where the reception means has received plural kinds of the function control information, deciding an order in which a function control process is executed based upon the execution order of the function that the storage means stores. Such a configuration makes it possible to antecedently execute a control of the valid function because the order of the function control process is decided even in a case of having received plural kinds of the function control information. Further, it is possible not to take the function control that is not valid. In addition hereto, even in a case of having received plural kinds of the function control information for one function, the function control described in the valid function control information can be antecedently executed by removing a competition because the process order of the function control information is decided.

Further, the terminal device may include storage means for pre-storing an execution order of the controllable function, and the condition determination means may be means for, in a case where the reception means has received plural kinds of the function control information, deciding an order in which a function control process is executed based upon the execution order that the storage means stores, and the evaluation information described in the function control information. Such a configuration makes it possible to antecedently take a control of the valid function because the order of the function control process is decided even in a case of having received plural kinds of the function control information. Further, it is possible not to take the function control that is not valid. In addition hereto, even in a case of having received plural kinds of the function control information for one function, the function control described in the valid function control information can be antecedently executed by removing a competition because the process order of the function control information is decided.

The external request type function control method in accordance with the present invention, which is an external request type function control method of controlling a function of a terminal device in a system including the terminal device and a function control information transmitting device for transmitting function control information including an instruction for controlling a function of the terminal device, in which the terminal device and the function control information transmitting device make communication with each other, is characterized in including: a step in which the function control information transmitting device transmits the function control information; a step in which the terminal device monitors a state of the function that could be specified in the function control information; a step in which the terminal device determines whether or not the function specified in the function control information received from the function control information transmitting device is controllable based upon the monitoring result, and determines whether or not a control of the function indicated by the function control information is executable; and a step in which the terminal device executes the control of the function specified in the function control information based upon the determination result.

Further, the external request type function control method, which is an external request type function control method of controlling a function of a terminal device in a system including the terminal device and a function control information transmitting device for transmitting function control information, in which the terminal device and the function control information transmitting device make communication with each other, may include: a step in which the function control information transmitting device transmits function control information having a function of the terminal device, being a control object, and a control state of the function described; and a step in which when the terminal device receives the function control information, it controls the function based upon the received function control information. Such a configuration, which does not necessitate a large-scale system employing a base station, makes it possible to control the function of the terminal device in some cases, and to provide the service in some cases in conformity with the environment, the location and the situation from the outside of the terminal device even though the terminal device is not caused to pre-store the control content, and yet the user of the terminal device is not aware of the function. That is, the terminal device does not have to prepare in advance a control signal that is transmitted from the function control information transmitting device, the function that is controlled by the control signal, and a control correspondence rule.

Further, the external request type function control method may include: a step in which the terminal device stores a control source, being a cause of having changed a state of the function into a current state; a step in which the terminal device compares a priority degree of the current control source of the function specified in the function control information, which is stored, with a priority degree that is included in the function control information, thereby to determine whether or not the function control by the function control information is executable; and a step in which the terminal device executes the function control of the terminal device based upon the determination result of the executability/non-executability. Such a configuration makes it possible to take the function control of the terminal device by the function control information from the outside without disturbing the function that is currently being activated by the user's operation etc.

Further, the external request type function control method may include: a step in which reliability information including a signature is described in the function control information, and when the terminal device receives the function control information, it determines whether or not the function control information transmitting device, being a transmission source that has transmitted the function control information, and a transmission source described in the function control information coincide with each other based upon the reliability information that is included in the received function control information, and determines existence of tampering of the function control information, thereby to determine credibility of the function control information; and a step in which the terminal device executes the function control of the terminal device based upon the determination result of the credibility.

Such a configuration makes it possible to prevent the function control by the function control signal bearing malice, the function control signal assuming a false sender, etc.

Further, the external request type function control method may include: a step in which a condition for controlling the function is described in the function control information, and when the terminal device receives the function control information, it determines whether or not a state of the terminal device meets a condition described in the received function control information; and a step in which the terminal device controls the function of the terminal device based upon the determination result. Such a configuration makes it possible to control only the function of the terminal device that has met the condition, out of the functions of the terminal device having received the function control information.

Further, the external request type function control method may include: a step in which evaluation information indicating validity of the function control is described in the function control information, and when the terminal device receives the function control information, it determines whether or not a permission for executing the function control is requested of a user of the terminal device based upon the evaluation information that is included in the received function control information; and a step in which the terminal device executes the function control of the terminal device based upon the determination result of the execution permission. Such a configuration makes it possible to automatically execute the function control described in the function control information in some cases, and to execute only the function control permitted by the user in some cases.

Further, the external request type function control method may include: a step in which evaluation information indicating validity of the function control is described in the function control information, and in a case where the terminal device has received plural kinds of the function control information, it decides an order in which a function control process is executed based upon the evaluation information described in the received function control information; and a step in which the terminal device executes the function control of the terminal device according to the decided order. Such a configuration makes it possible to antecedently take a control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

Further, the external request type function control method may include: a step in which an execution order is pre-affixed to the controllable function of the terminal device, and in a case where the terminal device has received plural kinds of the function control information, it decides an order in which a function control process is executed based upon the pre-affixed execution order of the function; and a step in which the terminal device executes the function control of the terminal device according to the decided order. Such a configuration makes it possible to antecedently execute the control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

Further, the external request type function control method may include: a step in which evaluation information indicating validity of the function control is described in the function control information, and in a case where the terminal device has received plural kinds of the function control information, it decides an order in which a function control process is executed based upon the pre-affixed execution order of the functions and evaluation information described in the function control information; and a step in which the terminal device executes the function control of the terminal device according to the decided order. Such a configuration makes it possible to antecedently execute the control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

The external request type function control program in accordance with the present invention, which is an external request type function control program for allowing a function of a terminal device to be controlled, is characterized in causing a computer to execute the processes of: receiving function control information including an instruction for controlling a function of the terminal device, which is transmitted by an external function control information transmitting device of the terminal device; monitoring a state of the function that could be specified in the function control information; determining whether or not the function specified in the received function control information is controllable based upon the monitoring result, and determining whether or not a control of the function indicated by the function control information is executable; and controlling the function of the terminal device based upon the determination result. Such a configuration, which does not necessitate a large-scale system employing a base station, makes it possible to control the function of the terminal device in some cases, and to provide the service in some cases in conformity with the environment, the location and the situation from the outside of the terminal device even though the terminal device is not caused to pre-store the control content, and yet the user of the terminal device is not aware of the function.

Further, the external request type function control program may be a program for causing the computer to execute the processes of: storing a control source, being a cause of having changed a state of the function into a current state; comparing a priority degree of the current control source of the function specified in the function control information, out of the stored control sources, with a priority degree that is included in the function control information, thereby to determine whether or not the function control by the function control information is executable; and controlling the function of the terminal device based upon the determination result of the executability/non-executability. Such a configuration makes it possible to execute the function control of the terminal device by the function control information from the outside without disturbing the function that is currently being activated by the user's operation etc.

Further, the external request type function control program may be a program for causing the computer to execute the processes of: determining whether or not the function control information transmitting device, being a transmission source that has transmitted the function control information, and a transmission source described in the function control information coincide with each other, and determining existence of tampering of the function control information; and controlling the function of the terminal device based upon the determination result. Such a configuration makes it possible to prevent the function control by the function control signal bearing malice, the function control signal assuming a false sender, etc.

Further, the external request type function control program may be a program for causing the computer to execute the processes of: determining whether or not a state of the terminal device meets a condition under which the function control described in the function control information is executed; and controlling the function of the terminal device based upon the determination result. Such a configuration makes it possible to control only the function of the terminal device that has met the condition, out of the functions of the terminal device having received the function control information.

Further, the external request type function control program may be a program for causing the computer to execute the process of, based upon evaluation information described in the function control information, deciding whether or not a permission for executing the function control is requested of a user of the terminal device. Such a configuration makes it possible to automatically execute the function control described in the received function control information in some cases, and to execute only the function control permitted by the user in some cases.

Further, the external request type function control program may be a program for causing the computer to execute the process of, in a case of having received plural kinds of the function control information, deciding an order in which a function control process is executed based upon evaluation information described in the received function control information. Such a configuration makes it possible to antecedently take a control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

Further, the external request type function control program may be a program for causing the computer to execute the processes of: pre-storing an execution order of the controllable function; and in a case of having received plural kinds of the function control information, deciding an order in which a function control process is executed based upon the stored execution order of the function. Such a configuration makes it possible to antecedently take a control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

Further, the external request type function control program may be a program for causing the computer to execute the processes of: pre-storing an execution order of the controllable function; and in a case of having received plural kinds of the function control information, deciding an order in which a function control process is executed based upon the stored execution order of the function and evaluation information described in the function control information. Such a configuration makes it possible to antecedently take a control of the valid function because the order of the function control process is decided even in a case of having received plural kinds of the function control information. Further, it is possible not to execute the function control that is not valid. In addition hereto, even in a case of having received plural kinds of the function control information for one function, the function control described in the valid function control information can be antecedently executed by removing a competition because the process order of the function control information is decided.

Effects of the Invention

In accordance with the present invention, the terminal device receives the function control information for controlling the function of the terminal device, the application software, and the service from the external function control information transmitting device in conformity with the environment and the situation. And, the terminal device controls the function automatically based upon the received function control information. Accordingly, the user of the terminal device can utilize the function control and the application software adapted to the environment, the location and the situation, and can receive the service that is provided even though the user is not aware thereof.

BRIEF DESCRIPTION OF THE DRAWINGS

FIG. 1 is an explanatory view illustrating one example of a configuration of the external request type function control system in accordance with the present invention.

FIG. 2 is a configuration view illustrating one example of the configuration of the function control information transmitter 30.

FIG. 3 is an explanatory view illustrating one example of the function control information 40.

FIG. 27 is an explanatory view illustrating an example of the specific content of function control information 40-*a* to 40-*e* that each function control information transmitter 30 transmits.

Figure 4:
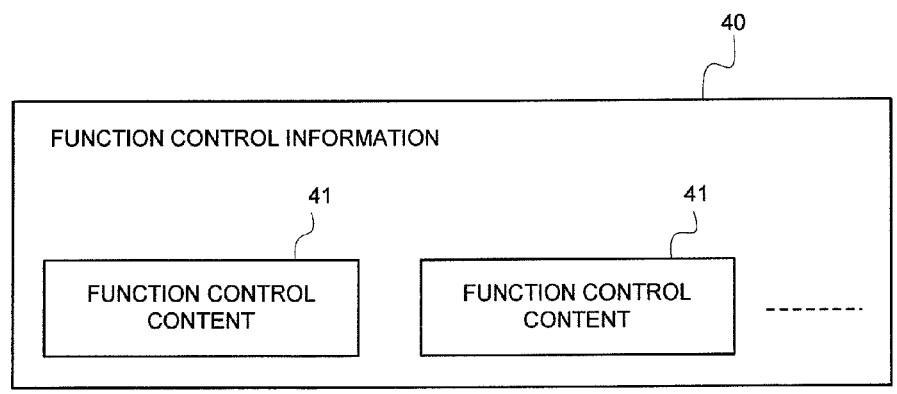
FIG. 4 is an explanatory view illustrating another example of the function control information 40.

DESCRIPTION OF NUMERALS 10 mobile telephone
11 reception section
12 adjuster
13 monitor
14 function controller
15 function section
20 storage section
30 function control information transmitter
31 transmission section
32 information filer
40 function control information
41 function control content

BEST MODE FOR CARRYING OUT THE INVENTION

Embodiment 1

Hereinafter, a first embodiment of the present invention will be explained by making a reference to the accompanied drawings. FIG. 1 is an explanatory view illustrating one example of a configuration of the external request type function control system in accordance with the present invention. As shown in FIG. 1, the external request type function control system includes a mobile telephone 10, being a terminal device, and a function control information transmitter 30 for transmitting function control information 40 for controlling a function of the mobile telephone 10.

Additionally, in this embodiment, an example in which the terminal device is the mobile telephone 10 will be explained; however the terminal device may be a portable terminal such as a PDA (Personal Data Assistance, Personal Digital Assistants: personal portable-type information communication appliance), a mobile terminal such as a machine having a car navigation system mounted, and a fixed terminal other than the mobile terminal.

The function control information transmitter 30 is mounted, for example, in an area in which use of the mobile telephone 10 should be controlled, or an entrance to its area, that is, in an airplane and at an entrance to the airplane (a gate position of an airport) in which use of the mobile telephone 10 should be prohibited, or the like. FIG. 2 is a configuration view illustrating one example of the configuration of the function control information transmitter 30. As shown in FIG. 2, the function control information transmitter 30 includes a transmission section 31 for transmitting the function control information 40, and an information filer 32 for storing the function control information 40.

FIG. 3 is an explanatory view illustrating one example of the function control information 40. The function control information 40 that the function control information transmitter 30 transmits has a function control content 41 described as shown in FIG. 3. A function that becomes an object of control, out of the functions of the mobile telephone 10, and information for specifying how its control object function is controlled are included in the function control content 41.

For example, there is often the case that an electric power of the mobile telephone 10 of a passenger should be compulsorily switched off in the gate position of the airport. In this case, for example, the function control content 41 includes "an electric power supply function" as a function of a control object, and information saying the effect that an electric power section of the mobile telephone 10 is caused to switch off an electric power as information for specifying the control content. Additionally, the function control content 41 may include, for example, "a sound function" as a function of a control object, and information saying the effect that a voice of an incoming melody is output as information for specifying the control content. Further, the function control content 41 may include, for example, "a camera function" as a function of a control object, and information saying the effect that a camera is incapacitated for starting as information for specifying the control content.

Further, FIG. 4 is an explanatory view illustrating another example of the function control information 40. The function control information 40 may include a plurality of the function control contents 41 as shown in FIG. 4.

Figure 5:
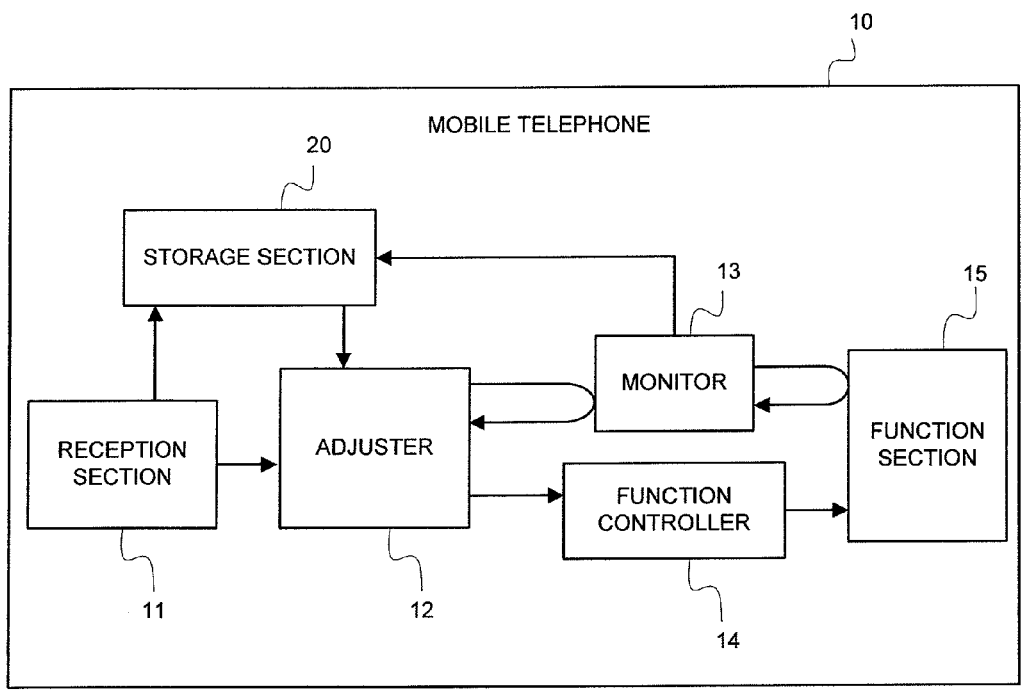
FIG. 5 is a configuration view illustrating one example of the configuration of the mobile telephone 10.

FIG. 5 is a configuration view illustrating one example of the configuration of the mobile telephone 10. As shown in FIG. 5, the mobile telephone 10 includes a reception section 11, an adjuster 12, a monitor 13, a function controller 14 for controlling the function of the mobile telephone 10, a function section 15 that is function- controlled by the function controller 14, and a storage section 20 for storing information.

The reception section 11 receives the function control information 40 that the function control information transmitter 30 transmits. The monitor 13 grasps an operational state of all functions of the function section 15 that is controlled in the mobile telephone 10. In this embodiment, the monitor 13 grasps each function of the mobile telephone 10. For example, the monitor 13 grasps information as to which function the mobile telephone 10 currently includes by causing the storage section 20 to store it. Further, for example, the monitor 13 grasps the state etc. as to whether or not each function of the mobile telephone 10 is currently being executed by causing the storage section 20 to store it.

The adjuster 12 determines whether or not the function specified in the function control information 40 exists in the functions of the mobile telephone 10. Further, in a case where the specified function exists, the adjuster 12 inquires of the monitor 13 an operational state of its function, thereby to determine whether or not the function control specified in the function control information 40 is possible. The function controller 14 outputs a control command of the function, being a control object, specified in the function control information 40 to the function section 15, and controls the function of the function section 15.

Specifically, the function section 15 includes an electric power section for realizing an electric power supply function, a radio wave transmission/reception section for realizing a radio signal transmission/reception function, a sound section for realizing a voice output function, a vibrator section for realizing a vibration function, a display section for realizing a display function for a display device etc., a camera section for realizing an image photographing function, a light section for realizing a backlight lighting function of a liquid crystal, and so on. Further, the function section 15 includes a browser section for realizing a browser display function, and a controller for realizing an execution function of various kinds of application software.

Specifically, the storage section 20 is realized by means of a memory etc. The storage section 20 stores the function control information 40 received from the function control information transmitter 30 and a process result. The function that should be controlled, and a control state of its function are stored in the function control information 40 that the storage section 20 stores.

Additionally, in this embodiment, the storage section 20 has various programs stored for automatic-controlling the function of the terminal device (mobile telephone 10). For example, the storage section 20 has an external request type function control program stored for causing the computer to execute the processes of: receiving the function control information including an instruction for controlling the function of the terminal device, which the external function control information transmitting device of the terminal device transmits; monitoring a state of the function that could be specified in the function control information; based upon the monitoring result, determining whether or not the function specified in the received function control information is controllable, and determining whether or not the control of the function indicated in the received function control information is executable; and based upon the determination result, controlling the function of the terminal device.

Figure 6:
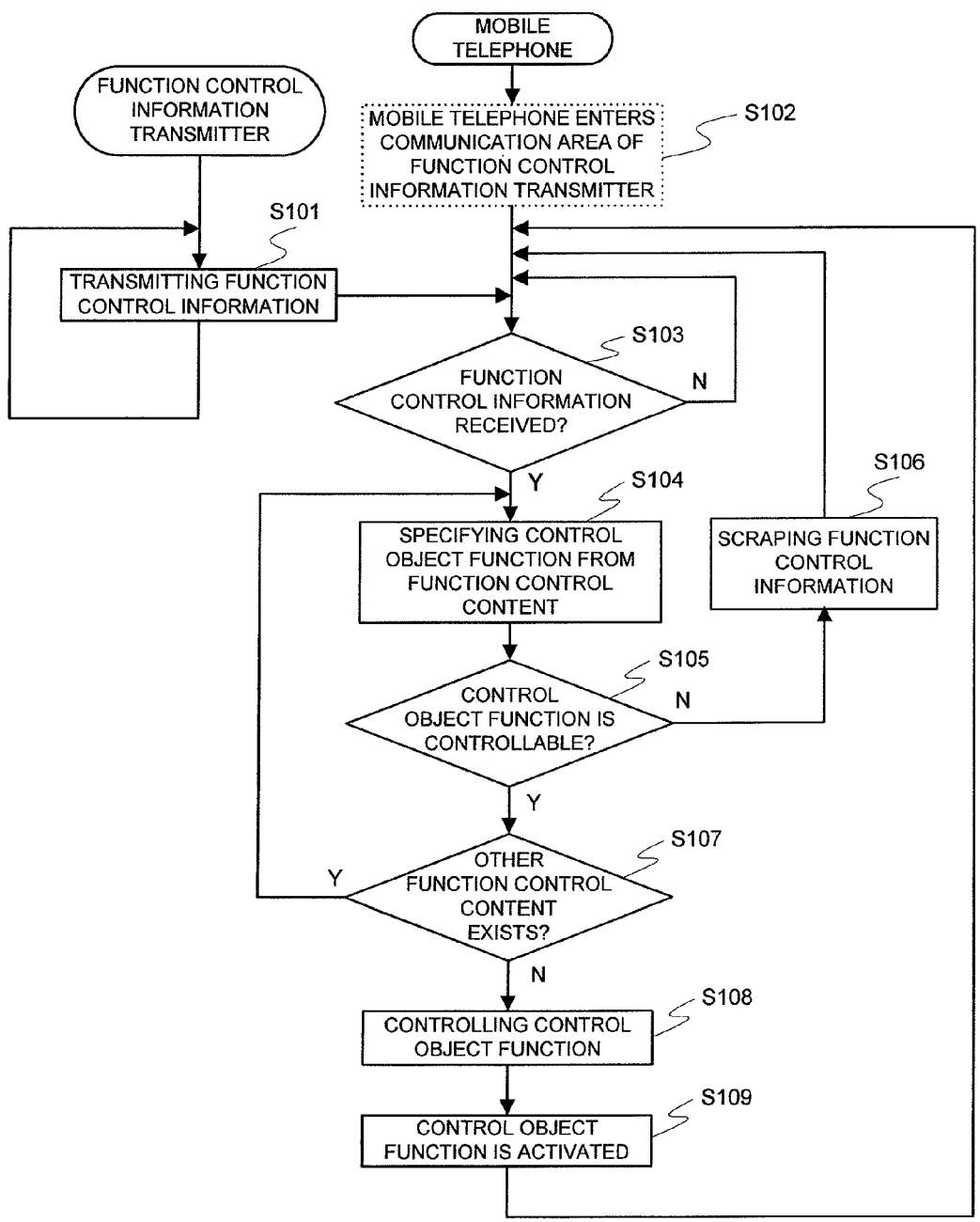
FIG. 6 is a flowchart illustrating one example of the function control process that the external request type function control system executes.

Next, an operation will be explained. FIG. 6 is a flowchart illustrating one example of the function control process that the external request type function control system executes. The function control information transmitter 30 repeatedly transmits the function control information 40, which the information filer 32 stores, consecutively or intermittently (step S101). Further, the function control information transmitter 30 may transmit the function control information 40 repeatedly based on some trigger. For example, the function control information transmitter 30 transmits the function control information 40 with detection of the mobile telephone 10 having approached by employing a GPS and a short-distance sensor in some cases, detection of the surroundings having become dark by employing an optical sensor in some cases, reception of a signal from the mobile telephone 10 in some cases, or the like assumed to be a trigger, respectively.

When the mobile telephone 10 enters a communication area of the function control information transmitter 30 (step S102), the reception section 11 of the mobile telephone 10 employs the communication means (for example, another antenna and transmission/reception section) other than the communication means that is employed for making a call, thereby to receive the function control information 40 from the function control information transmitter 30 (step S103). And, the reception section 11 causes the storage section 20 to store the received function control information 40.

The adjuster 12 specifies a function, being an object of control, based upon the function control content 41 described in the function control information 40 received by the reception section 11 (step S104). Further, the adjuster 12 inquires of the monitor 13 whether or not the specified control object function exists in the functions of the mobile telephone 10. Further, the adjuster 12 inquires of the monitor 13 whether or not the specified control object function is controllable (step S105).

In a case of having received the effect that the control object function does not exist, or the effect that the specified control object function is uncontrollable from the monitor 13, the adjuster 12 scraps the function control information 40 received by the reception section 11, and erases the function control information 40 that the storage section 20 stores (step S106). In a case of having received the effect that the control object function is controllable from the monitor 13, the adjuster 12 determines whether or not the other function control content 41 is included in the function control information 40 (step S107). In a case where the other function control content 41 exists (in a case of having determined that the other function control content 41 is included), the adjuster 12 inquires of the monitor 13 again, thereby to determine whether or not the function of the control object is controllable.

When the adjuster 12 determines that all of the function control contents 41 described in the function control information 40 are controllable, and determines in the step S107 that the other function control content 41 does not exist, the function controller 14 sends (transmits) a control command for the control object function to the function section 15, thereby to control the control object function (step S108). And, the function section 15 activates the control object function according to an instruction from the function controller 14 (step S109).

As mentioned above, in this embodiment, the terminal device (mobile telephone 10) receives the information (function control information 40) for controlling the function of the terminal device, the application software, and the service in conformity with the environment and the situation from the external function control information transmitter 30. And, the terminal device automatically controls the function based upon the received function control information 40. Accordingly, it is possible to utilize the function control and the application software adapted to the environment, the location, and the situation, and to receive the service that is provided even though the user of the terminal device is not aware thereof.

Further, in accordance with this embodiment, the function of analyzing and executing the function control information within the terminal device, and the large-scale server for determining the application software and the service are rendered unnecessary. Accordingly, the system, which enables the function, the application software, and the service adapted to the environment and the location of the terminal device to be automatically used, can be realized even though it is of comparatively small size.

Further, in accordance with this embodiment, upon having grasped a state of the function as to whether or not each function is currently being activated, or the like, the adjustment means (adjuster 12) of the terminal device determines executability of the function control, and executes the function control. Accordingly, the adjustment means can execute the function control without marring a user's convenience even while the terminal device performs some process.

Further, in accordance with this embodiment, the terminal device does not pre-store the function control information and a correspondence table of the function control, but analyzes and controls the function control information received from the outside. Accordingly, the terminal device, which has a function of analyzing and controlling the function control information, can execute the function control even though it does not pre-store the control content.

Additionally, in this embodiment, the case where the mobile telephone 10 migrated was explained; however in the external request type function control system, this embodiment is also applicable to the case where the terminal device does not migrate, but the function control information transmitter 30 migrates. Further, by changing a timing at which the function control information 40 is transmitted in some cases, and by changing the content of the function control information 40 in some cases, the function of the terminal device may be controlled.

Embodiment 2

Next, a second embodiment of the present invention will be explained by making a reference to the accompanied drawings. In this embodiment, a configuration of the external request type function control system is similar to the configuration shown in FIG. 1; however this embodiment differs from the first embodiment in the content of the function control information 40.

In this embodiment, for example, in a case where the function, being a control object, specified in the function control information 40 has been already executed within the mobile telephone 10 by a user's operation etc., the mobile telephone 10 determines whether the function control specified in the function control information 40 is preferentially executed, or the process that is being executed by a user's operation etc. is given a priority.

Figure 7:
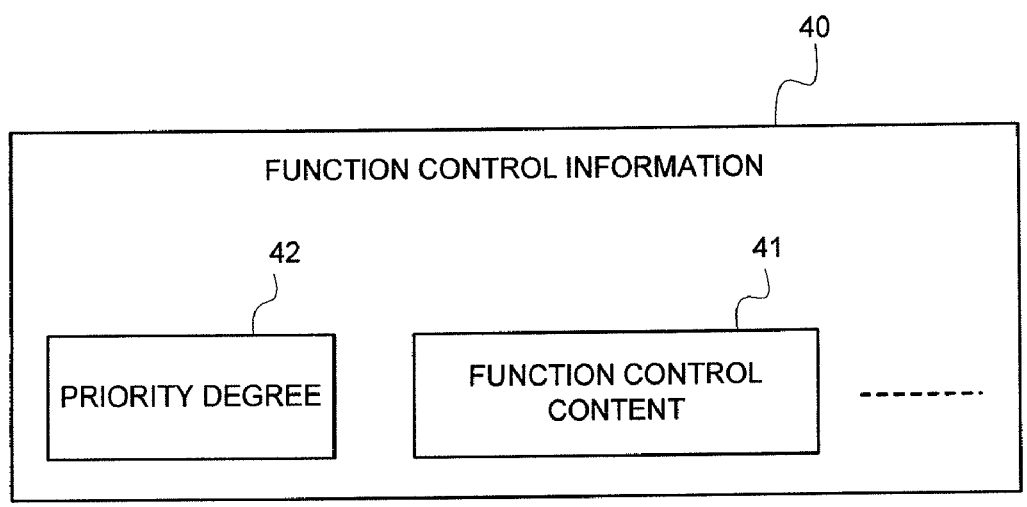
FIG. 7 is an explanatory view illustrating yet another example of the function control information 40.

FIG. 7 is an explanatory view illustrating yet another example of the function control information 40. As shown in FIG. 7, the function control information 40 includes a priority degree 42 of the function control that is specified in the function control content 41 in addition to the function control content 41 shown in FIG. 3. In this embodiment, the priority degree 42 that is included in the function control information 40 is employed for making a determination as to which is given a priority, out of the function control that is specified in function control information 40 and the process that allows its function, being a control object, to be activated.

Further, in this embodiment, a configuration of the mobile telephone 10 is similar to the configuration shown in the first embodiment; however this embodiment differs from the first embodiment in the process contents of the adjuster 12 and the monitor 13 of the mobile telephone 10. Further, this embodiment differs from the first embodiment in the content of the information that is stored in the storage section 20.

In this embodiment, the monitor 13 causes the storage section 20 to store a control source, being a cause of having changed a state of each function of the mobile telephone 10 into a current state, in addition to performing the process shown in the first embodiment. For example, in a case where the radio signal transmission/reception function has been off-lined by a user's operation, the monitor 13 causes the storage section 20 to store "a user" as a current control source of the radio signal transmission/reception function. Further, for example, in a case where the radio signal transmission/reception function has been off-lined by the control function by the function control information 40 from the outside, the monitor 13 causes the storage section 20 to store the function control information transmitter 30, being a transmission source of its function control information 40, as a current control source of the radio signal transmission/reception function.

Further, in this embodiment, the storage section 20 stores a control source, being a cause of having changed a state of its function into a current state, function by function in addition to the information content shown in the first embodiment. Further, the storage section 20 stores a priority degree of each control source. This embodiment has the priority degree of the control source, which the storage section 20 stores, and the priority degree 42, which is included in the function control information 40, stored in a relatively comparable format. For example, this embodiment has information indicating a priority order as a priority degree described.

Further, in this embodiment, the adjuster 12 compares the priority degree 42 of the function control described in the function control information 40 with the priority degree of the current control source of the control object function in addition to performing the process shown in the first embodiment. In a case where the priority degree 42 of the function control information 40 is higher than the priority degree of the current control source, the adjuster 12 determines that the function control is possible. Further, in a case where the priority degree 42 of the function control information 40 is lower than the priority degree of the current control source, the adjuster 12 determines that the function control is impossible, and scraps the function control information 40.

Figure 8:
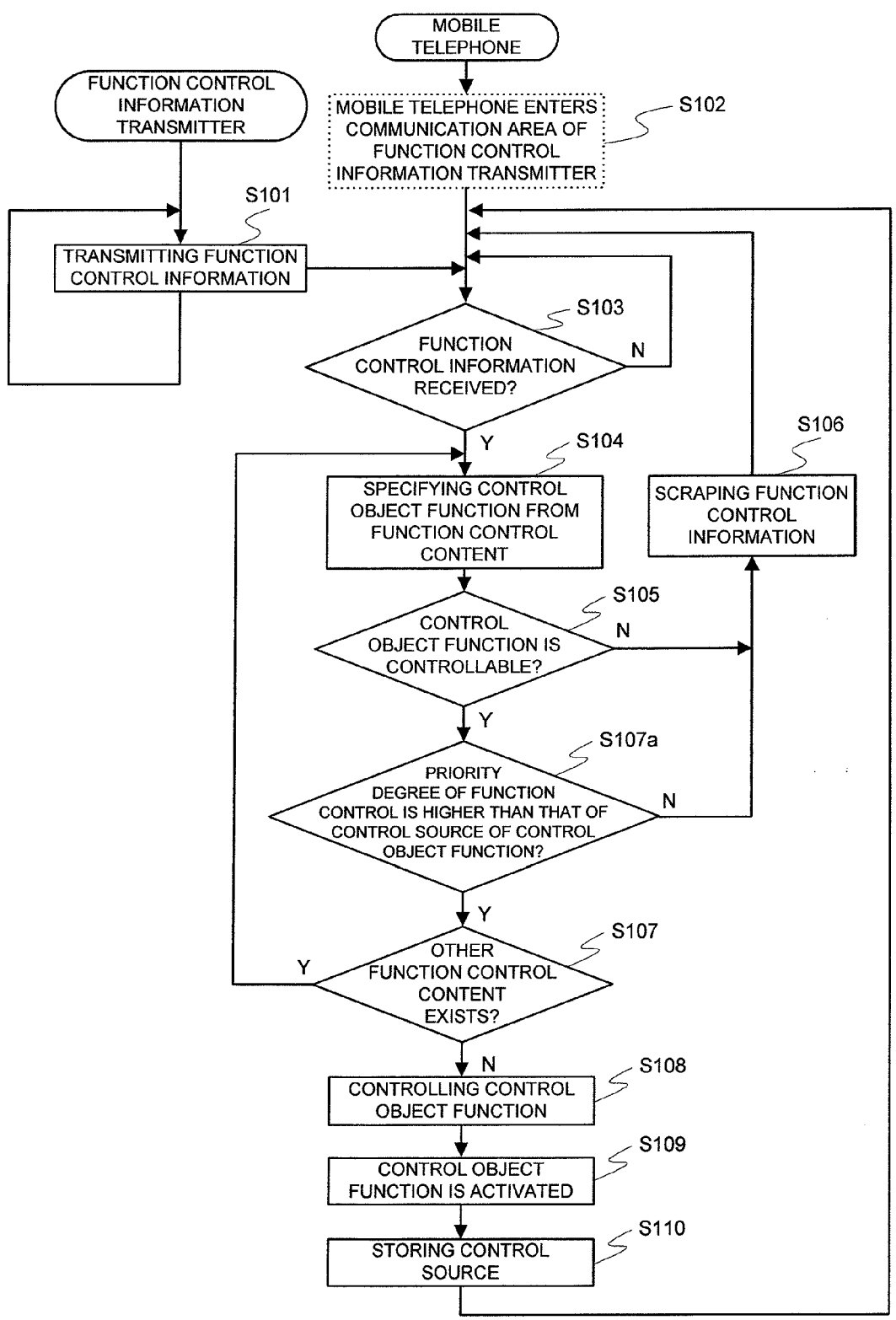
FIG. 8 is a flowchart illustrating another example of the function control process that the external request type function control system executes.

Next, an operation will be explained. FIG. 8 is a flowchart illustrating another example of the function control process that the external request type function control system executes. As shown in FIG. 8, in this embodiment, a process (step S107a) of comparing the priority degree 42 of the function control described in the function control information 40 with the priority degree of the current control source of the control object function, and a process (step S110) of storing the control source having executed the function control are included in addition to the process shown in FIG. 6. Additionally, FIG. 8 has an identical step number affixed to the process identical to the process shown in FIG. 6.

The function control information transmitter 30 repeatedly transmits the function control information 40 that the information filer 32 stores (step S101). In this embodiment, the function control information 40 has the priority degree 42 of the function control described in addition to the function control content 41 shown in the first embodiment. The function control information 40 includes, for example, values such as "Kou" and "Otsu" as the priority degree 42. Additionally, the priority degree 42 "Kou" indicates that it has a higher priority order than the priority degree 42 "Otsu".

When the mobile telephone 10 enters the communication area (step S102), and receives the function control information 40 (step S103), it causes the storage section 20 to store the received function control information 40. The adjuster 12 specifies a function, being a control object, based upon the function control content 41 (step S104). Further, when the adjuster 12 inquires of the monitor 13 whether or not the control object function is controllable (step S105) and determines that the control object function is controllable, the former inquires of the storage section 20 the current control source of its control object function. And, the adjuster 12 compares the priority degree of the control source, which the storage section 20 stores, with the priority degree 42 of the function control information 40, thereby to determine whether or not the priority degree of the function control of the function control information 40 is higher than that of the current control source (step S107a).

When the adjuster 12 determines that the priority degree 42 of the function control information 40 is higher than that of the current control source, it determines that the function control is possible. When the adjuster 12 determines that the priority degree 42 of the function control information 40 is lower than that of the current control source, it determines that the function control is impossible, and scraps the function control information 40 (step S106).

For example, the storage section 20 has stored a relation between the priority degree 42 of the function control information 40 and the priority degree of the control source. For example, the storage section 20 has stored a correspondence relation, which indicates that the operation by the user, being a control source, the incoming of a call and an e-mail of the control source, the priority degree 42 "Kou" of the function control information 40, the operation at the time of starting the mobile telephone 10, the priority degree 42 "Otsu" of the function control information 40, etc. are high in its order in terms of the priority degree. For example, the adjuster 12 determines whether or not the priority degree 42 of the function control information 40 is higher than the priority degree of the control source based upon the correspondence relation that the storage section 20 stores.

When the adjuster 12 determines that the function control of all of the function control contents 41 is possible, and yet the priority degree 42 is higher than the priority degree of the control source, the function controller 14 controls the control object function (step S108). And, the function section 15 activates the control object function according to an instruction by the function controller 14 (step S109).

Further, the monitor 13 causes the storage section 20 to store the priority degree 42 of the function control information 40 as a control source (step S110). For example, with the priority degree 42 "Kou", the monitor 13 causes the storage section 20 to store the current control source of the function-controlled function as the function control information "Kou". The control source that the storage section 20 was caused to store in the step S110 is employed for determining the priority degree at the moment that the mobile telephone 10 has received the function control information 40 next. For example, it is employed for making a comparison with the priority degree of the control source in a case where the function identical to the function of the function control information 40 received next has already been described as a control object function in the function control content 41. However, in a case where the user has performed the operation, the mobile telephone 10 executes the process by the user's operation more preferentially than the function control by the function control information 40.

As mentioned above, in accordance with this embodiment, the mobile telephone 10 has the control source, being a cause of having changed a state of the function into a current state, recorded. Further, the mobile telephone 10 includes the adjustment means (adjuster 12) for comparing the priority degree of the current control source of the function specified in the function control information 40 with the priority degree 42 of the function control information 40, thereby to determine whether or not the function control of the terminal device (mobile telephone 10) by the function control information 40 is possible. Accordingly, even in a case where the function is currently activated by a user's operation etc., the function of the terminal device can be controlled by the function control information 40 from the outside without disturbing the function that is active.

Embodiment 3

Next, a third embodiment of the present invention will be explained by making a reference to the accompanied drawings. In this embodiment, a configuration of the external request type function control system is similar to the configuration shown in FIG. 1; however this embodiment differs from the first embodiment in the content of the function control information 40 and the configuration of the mobile telephone 10.

Figure 9:
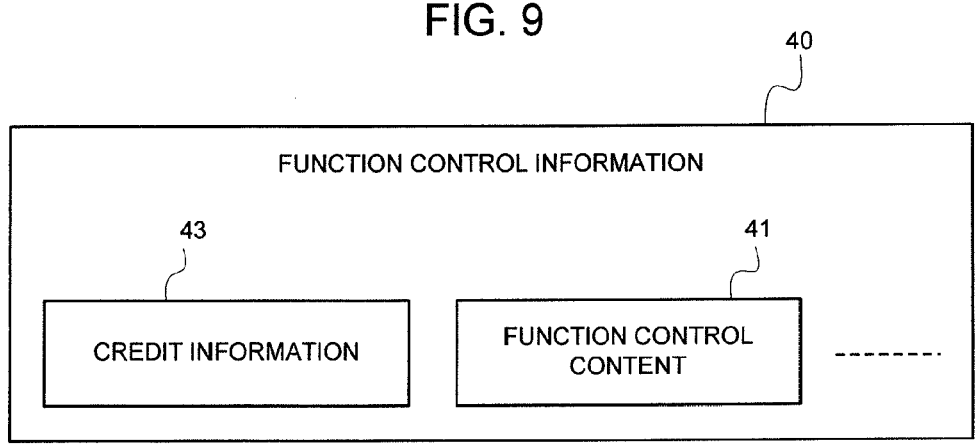
FIG. 9 is an explanatory view illustrating yet another example of the function control information 40.

FIG. 9 is an explanatory view illustrating yet another example of the function control information 40. As shown in FIG. 9, the function control information 40 includes credit information 43 having a signature etc. described for guaranteeing that a sender of the function control information 40 and the content of function control information 40 have not been tampered by another person in addition to the function control content 41 shown in FIG. 3.

Figure 10:
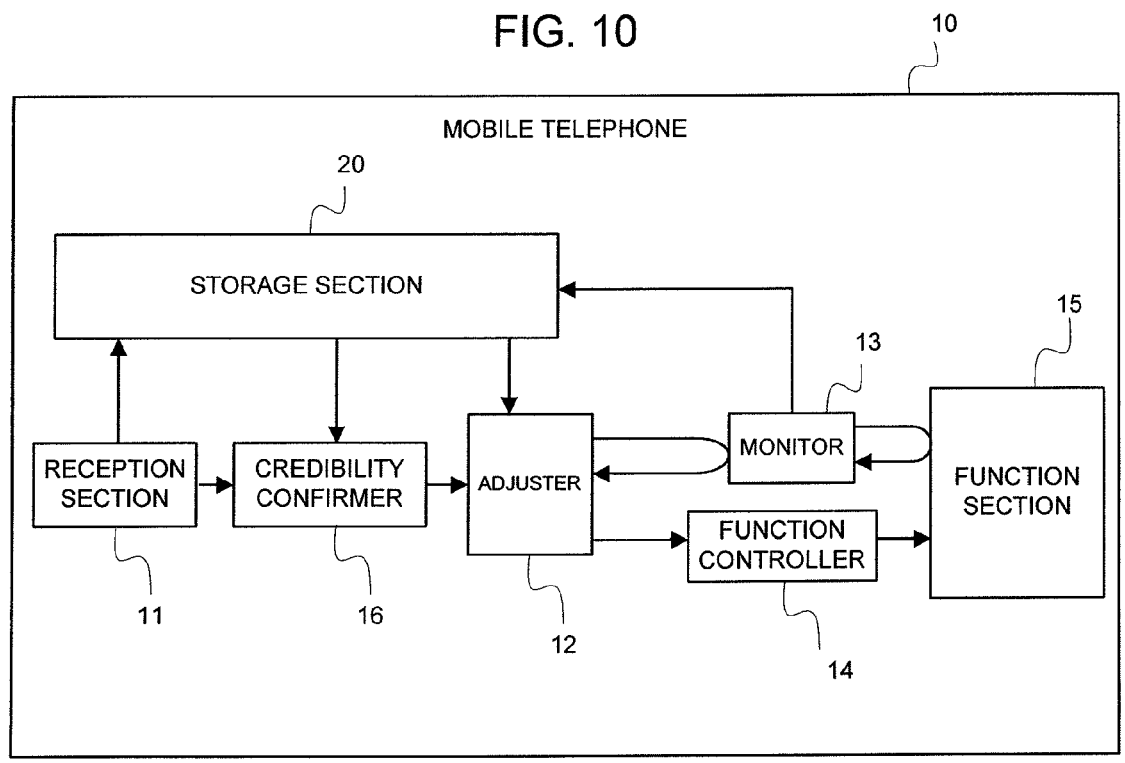
FIG. 10 is a block diagram illustrating another configuration example of the mobile telephone 10.

FIG. 10 is a block diagram illustrating another configuration example of the mobile telephone 10. As shown in FIG. 10, this embodiment differs from the first embodiment in a point that the mobile telephone 10 includes a credibility confirmer 16 in addition to the components shown in FIG. 5. Further, this embodiment differs from the first embodiment in the content of the information that is stored in the storage section 20. Additionally, FIG. 10 has an identical code affixed to an element identical to the component shown in FIG. 5.

The credibility confirmer 16 determines and verifies whether or not the sender that is included in the function control information 40 and the content of function control information 40 have not been tampered by another person based upon credit information 43 that is included in the function control information 40. The storage section 20 pre-stores information and an encryption key for verifying the sender and existence of the tampering in addition to the information content shown in the first embodiment. Additionally, it is also acceptable that the storage section 20 does not pre-store these verification information and encryption key, but the mobile telephone 10 acquires them by making communication with the outside, thereby to cause the storage section 20 to store them.

Figure 11:
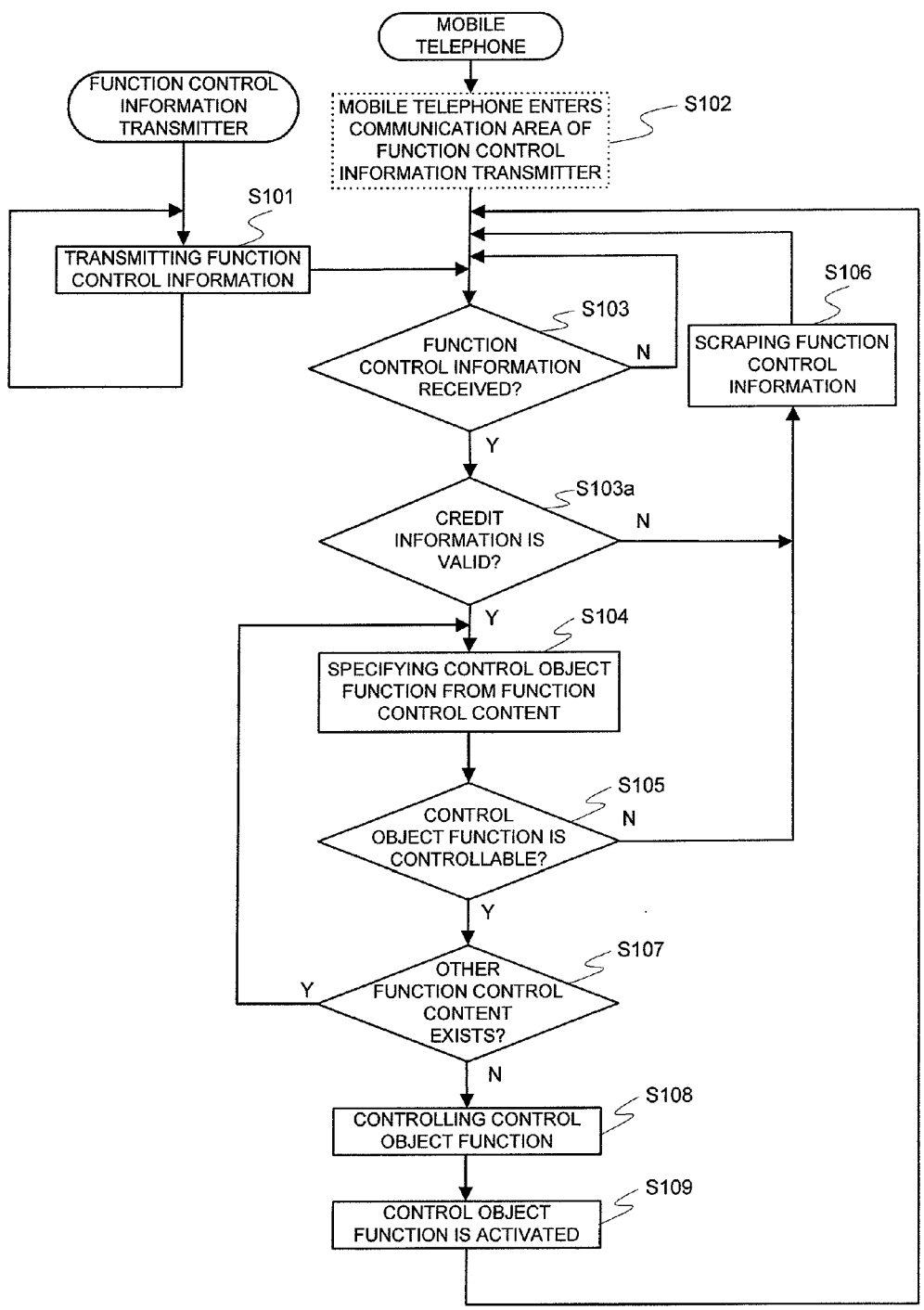
FIG. 11 is a flowchart illustrating yet another example of the function control process that the external request type function control system executes.

Next, an operation will be explained. FIG. 11 is a flowchart illustrating yet another example of the function control process that the external request type function control system executes. As shown in FIG. 11, in this embodiment, a process (step S103a) of confirming the credit information 43 of the function control information 40 is included in addition to the processes shown in FIG. 6. Additionally, FIG. 11 has an identical step number affixed to the process identical to the process shown in FIG. 6.

The function control information transmitter 30 repeatedly transmits the function control information 40 that the information filer 32 stores (step S101). In this embodiment, the function control information 40 has the credit information 43 described such as a certificate for certifying a sender issued by an authentication bureau, and an electronic signature for guaranteeing that another person has not tampered the content of the function control information 40 in addition to the function control content 41 shown in the first embodiment.

When the mobile telephone 10 enters the communication area (step S102), and receives the function control information 40 (step S103), it causes the storage section 20 to store the received function control information 40. The credibility confirmer 16 verifies existence of the tampering of the sender of the function control information 40 and the content of the function control information 40 based upon the credit information 43 of the function control information 40, and the information and encryption key for verifying the sender and existence of the tampering that the storage section 20 stores (step S103a). For example, the credibility confirmer 16 authenticates the credit information 43 by employing a public key encryption technology, thereby to determine existence of the tampering of the sender and the content of the function control information 40. In this case, the mobile telephone 10 may acquire it by inquiring of the authentication bureau in some cases, and receiving the encryption key from an external server via a network in some cases.

In a case where the credibility confirmer 16 has determined that a verification result is correct (that is, it has determined that the sender is correct and the content of the function control information 40 has not been tampered), the mobile telephone 10 executes the processes similar to the processes in the procedure shown in the first embodiment (step S104 to S109), and analyzes the content of the function control information 40, thereby to control the function, being a control object. In a case where the credibility confirmer 16 has determined that a verification result is not correct (that is, it has determined that the sender is not correct or the content of the function control information 40 has been tampered), the mobile telephone 10 scraps the function control information 40 (step S106).

As mentioned above, in accordance with this embodiment, the terminal device (the mobile telephone 10) includes credibility confirmation means (the credibility confirmer 16) for verifying the function control information 40. Accordingly, the terminal device can determine, select, and execute only reliable information out of the received function control information 40.

Embodiment 4

Next, a fourth embodiment of the present invention will be explained by making a reference to the accompanied drawings. In this embodiment, a configuration of the external request type function control system is similar to the configuration shown in FIG. 1; however this embodiment differs from the first embodiment in the content of the function control information 40 and the configuration of the mobile telephone 10.

Figure 12:
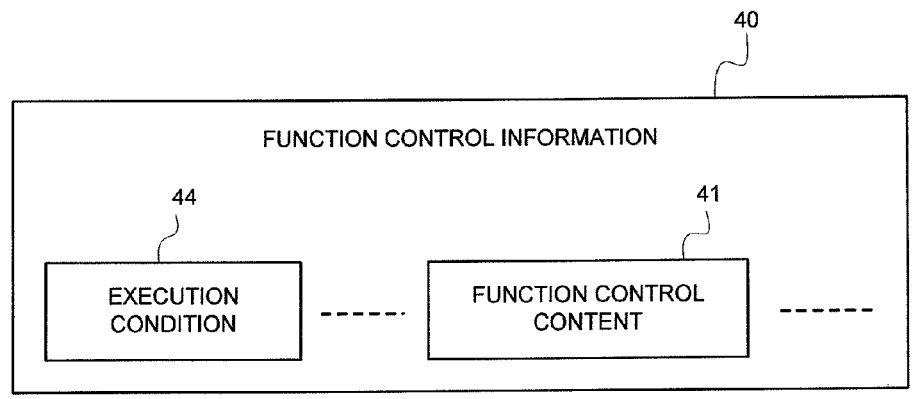
FIG. 12 is an explanatory view illustrating yet another example of the function control information 40.

FIG. 12 is an explanatory view illustrating yet another example of the function control information 40. As shown in FIG. 12, the function control information 40 includes an execution condition 44 indicating a condition for executing the function control in addition to the function control content 41 shown in FIG. 3. Additionally, the execution condition 44 may be described in plural in one kind of the function control information 40.

Figure 13:
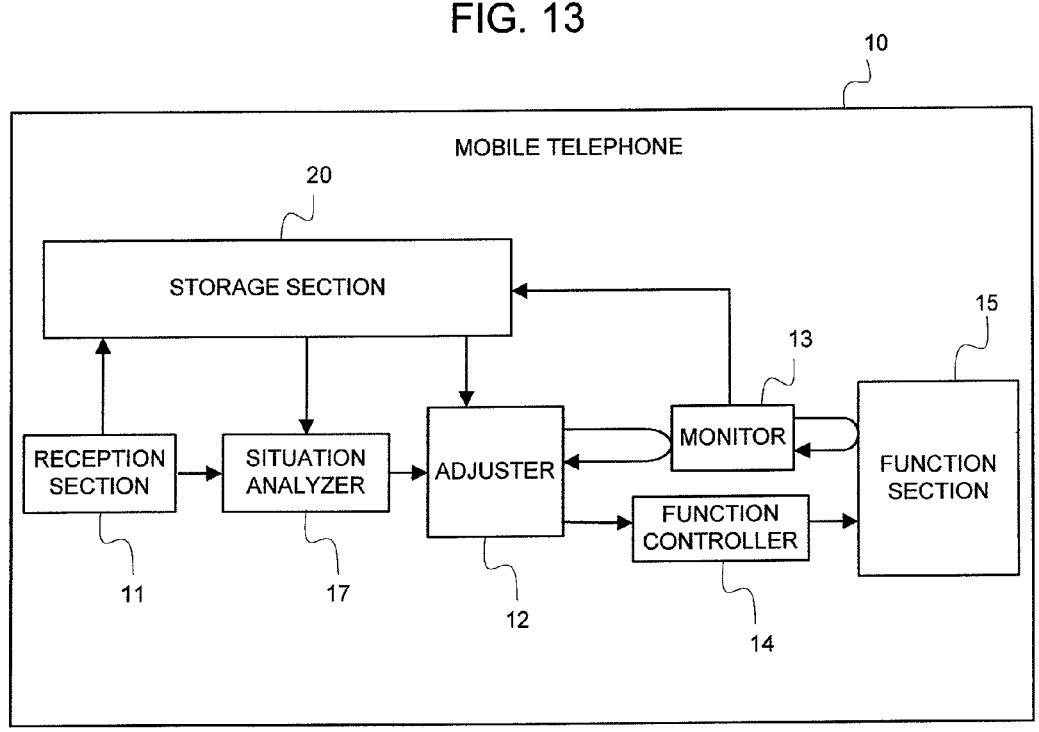
FIG. 13 is a block diagram illustrating yet another configuration example of the mobile telephone 10.

FIG. 13 is a block diagram illustrating yet another configuration example of the mobile telephone 10. As shown in FIG. 13, this embodiment differs from the first embodiment in a point that the mobile telephone 10 includes a situation analyzer 17 in addition to the components shown in FIG. 5. Additionally, FIG. 13 has an identical code affixed to an element identical to the component shown in FIG. 5.

The situation analyzer 17 determines and verifies whether or not the state of the mobile telephone 10 meets the execution condition 44 of the function control described in the function control information 40. For example, the situation analyzer 17 determines whether or not the noise situation in the surroundings of the mobile telephone 10, a processing capacity of the mobile telephone 10, and the operational situation meet the execution condition 44.

Figure 14:
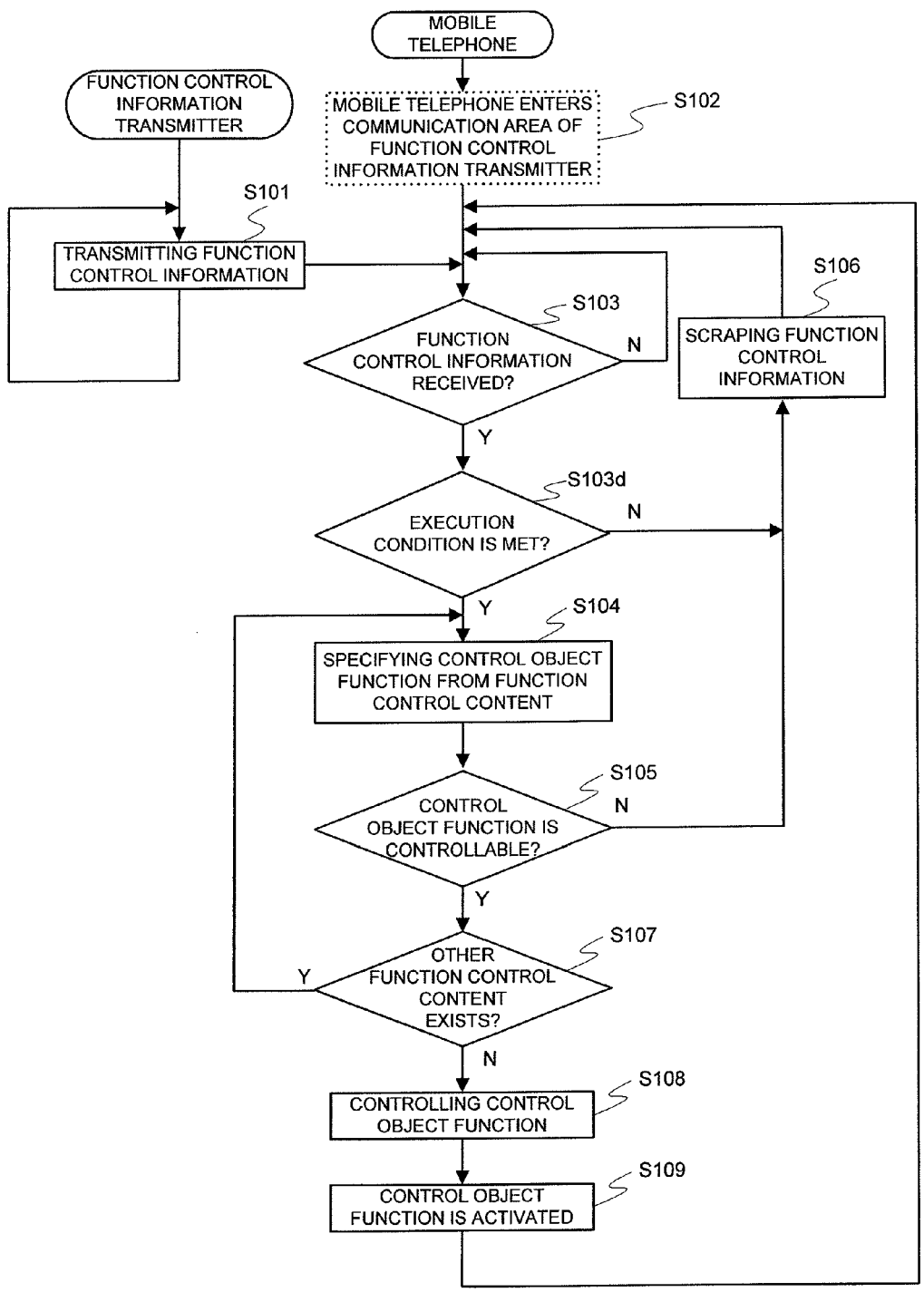
FIG. 14 is a flowchart illustrating yet another example of the function control process that the external request type function control system executes.

Next, an operation will be explained. FIG. 14 is a flowchart illustrating yet another example of the function control process that the external request type function control system executes. As shown in FIG. 14, in this embodiment, a process (step S103d) of confirming the execution condition 44 of the function control described in the function control information 40 is included in addition to the processes shown in FIG. 6. Additionally, FIG. 14 has an identical step number affixed to the process identical to the process shown in FIG. 6.

The function control information transmitter 30 repeatedly transmits the function control information 40 that is stored in the information filer 32 (step S101). In this embodiment, the function control information 40 has the execution condition 44 of the function control described in addition to the function control content 41 shown in the first embodiment. The execution condition 44 is, for example, a condition of a time and location, a condition based upon the situation of the surroundings such as a sound being noisy, a condition of an age and gender of the user of the mobile telephone 10, a condition based upon an ability and an operational situation of the mobile telephone 10, and a condition based upon the processes executed in the past by the mobile telephone 10.

When the mobile telephone 10 enters the communication area (step S102), and receives the function control information 40 (step S103), it causes the storage section 20 to store the received function control information 40. The situation analyzer 17 determines and verifies whether or not the state of the mobile telephone 10 meets the execution condition 44 of the function control information 40 (step S103d).

For example, in a case where the condition of a time is included in the execution condition 44, the situation analyzer 17 inputs the current time information by inquiring it of a timer section that the mobile telephone 10 includes, and determines whether or not the current time meets the execution condition 44. Further, in a case where the condition based upon the situation of the surroundings is included in the execution condition 44, the situation analyzer 17 employs a sensor value (for example, a sound volume) of a sensor that the mobile telephone 10 includes, thereby to determine whether or not the execution condition 44 is met. Further, in a case where the condition based upon an age of the user is included in the execution condition 44, the situation analyzer 17 determines whether or not the execution condition 44 is met based upon profile information that the storage section 20 pre-stores. Further, in a case where the condition based upon an operational situation of the mobile telephone 10 is included in the execution condition 44, the situation analyzer 17 determines the operational situation of each function by inquiring it of the monitor 13, thereby to determine whether or not the execution condition 44 is met.

In the step S103d, the situation analyzer 17 can acquire the time information from a timer of the mobile telephone 10, information of the location from a base station of the mobile telephone 10 and a GPS signal, information of the situation of the surroundings by employing sensors such as a microphone and a camera, and an age and gender of the user by causing a memory to store it, respectively. Additionally, in a case where a plurality of the conditions are included, the situation analyzer 17 determines and verifies whether or not all conditions are met.

In a case where the situation analyzer 17 has determined that a verification result is correct (that is, it has determined that the state of the mobile telephone 10 meets the execution condition 44), the mobile telephone 10 proceeds to a next process, and executes the processes similar to the processes in the procedure shown in the first embodiment (step S104 to S109). In a case where the situation analyzer 17 has determined that a verification result is not correct (that is, it has determined that the state of the mobile telephone 10 does not meet the execution condition 44), the mobile telephone 10 scraps the function control information 40 (step S106).

As mentioned above, in accordance with this embodiment, the terminal device (the mobile telephone 10) includes situation analysis means (the situation analyzer 17) for confirming the condition under which the function control is executed. Accordingly, it is possible to make a configuration so as to execute only the function control under which the state of the terminal device meets the execution condition 44, out of the received function control information 40.

Embodiment 5

Next, a fifth embodiment of the present invention will be explained by making a reference to the accompanied drawings. In this embodiment, a configuration of the external request type function control system is similar to the configuration shown in FIG. 1; however this embodiment differs from the first embodiment in the content of the function control information 40 and the configuration of the mobile telephone 10.

Figure 15:
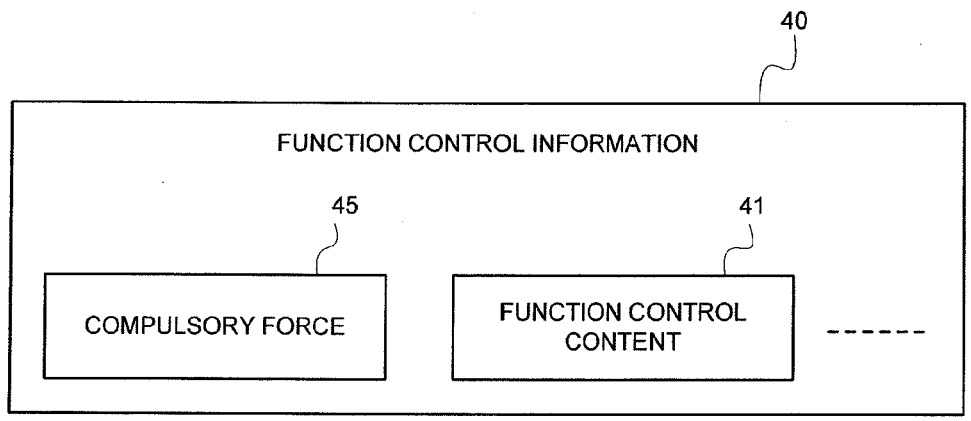
FIG. 15 is an explanatory view illustrating yet another example of the function control information 40.

FIG. 15 is an explanatory view illustrating yet another example of the function control information 40. As shown in FIG. 15, the function control information 40 includes a compulsory force 45, being information for specifying whether or not an execution of the function control is inquired of the user, in addition to the function control content 41 shown in FIG. 3. Additionally, the compulsory force 45 may be signified with the priority degree 42 shown in the second embodiment.

Figure 16:
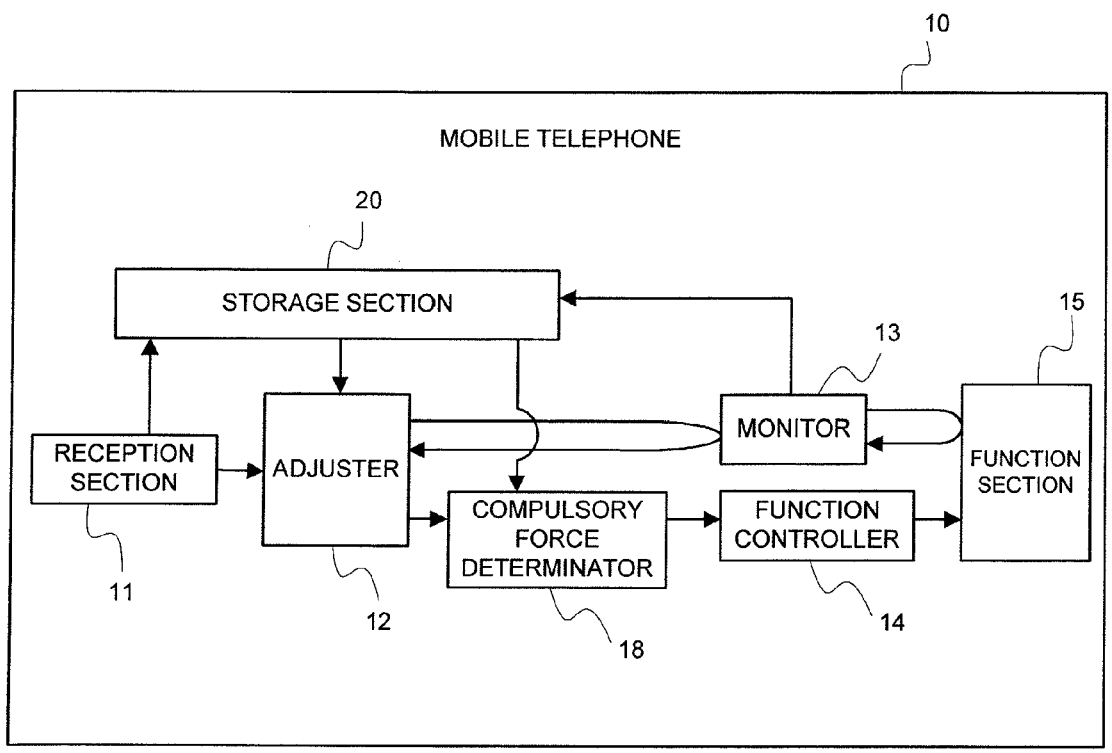
FIG. 16 is a block diagram illustrating yet another configuration example of the mobile telephone 10.

FIG. 16 is a block diagram illustrating yet another configuration example of the mobile telephone 10. As shown in FIG. 16, this embodiment differs from the first embodiment in a point that the mobile telephone 10 includes a compulsory force determinator 18 in addition to the components shown in FIG. 5. Additionally, FIG. 16 has an identical code affixed to an element identical to the component shown in FIG. 5.

The compulsory force determinator 18 determines whether or not an execution of the function control is inquired of the user of the mobile telephone 10 based upon the compulsory force 45 of the function control described in the function control information 40. The storage section 20 stores a process content corresponding to the compulsory force 45 described in the function control information 40 in addition to the information content shown in the first embodiment. For example, the storage section 20 stores the process content of the effect that with a compulsory force 45 "1", the object function is controllable even without inquiring it of the user. Further, the storage section 20 stores the process content of the effect that with a compulsory force 45 "2", an execution of the object function has to be inquired of the user before execution.

Figure 17:
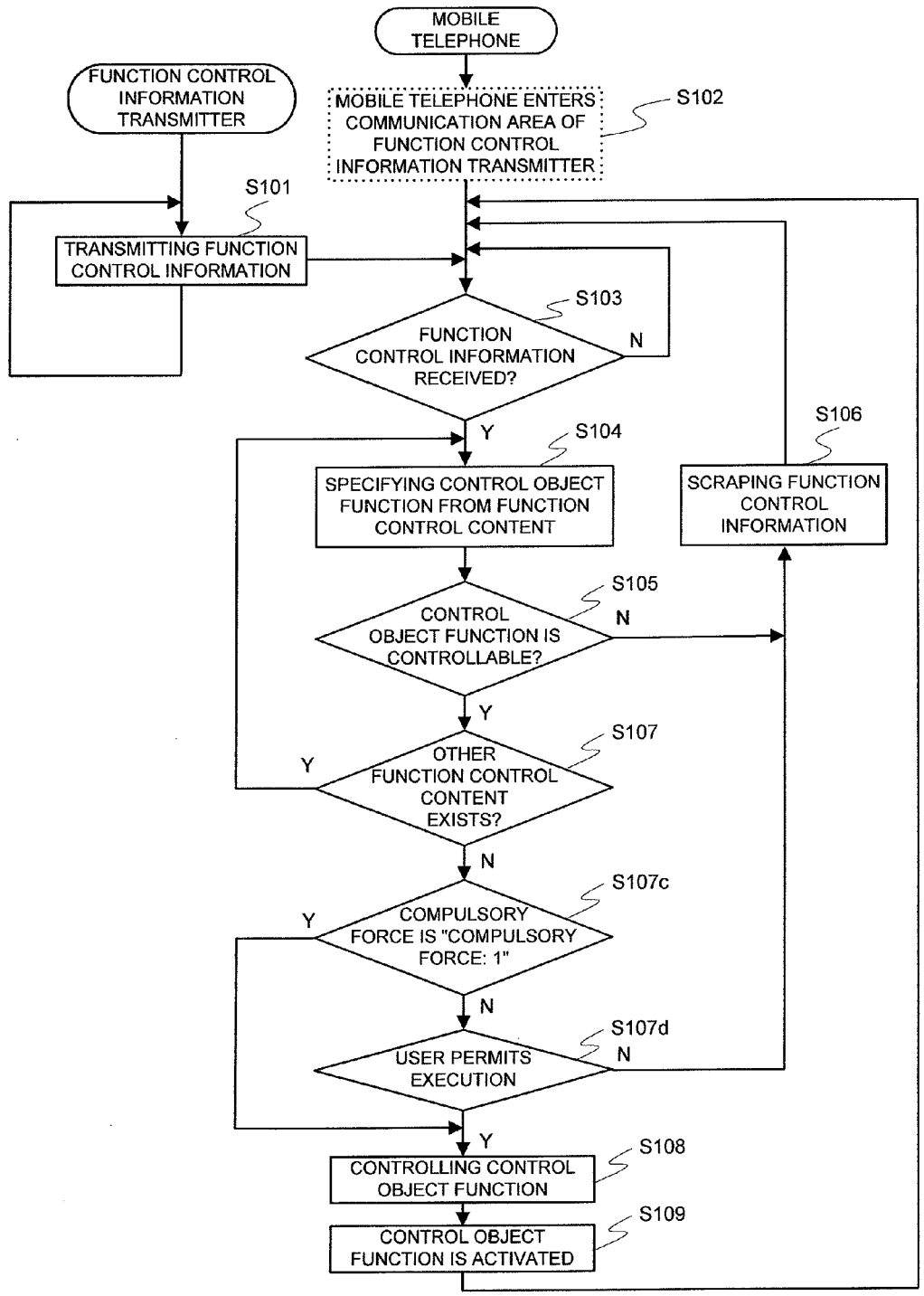
FIG. 17 is a flowchart illustrating yet another example of the function control process that the external request type function control system executes.

Next, an operation will be explained. FIG. 17 is a flowchart illustrating yet another example of the function control process that the external request type function control system executes. As shown in FIG. 17, in this embodiment, processes (step S107c and 107d) of selecting permission/refusal of an execution of the function control by the user of the mobile telephone 10, which employ the compulsory force 45 described in the function control information 40, are included in addition to the processes shown in FIG. 6. Additionally, FIG. 17 has an identical step number affixed to the process identical to the process shown in FIG. 6.

The function control information transmitter 30 repeatedly transmits the function control information 40 that the information filer 32 stores (step S101). In this embodiment, the function control information 40 has the compulsory force 45 of the function control described in addition to the function control content 41 shown in the first embodiment. For example, the function control information 40 has a compulsory force 45 "1", a compulsory force 45 "2" and so on described. Further, in this embodiment, the storage section 20 has pre-stored the process content of the effect that with the compulsory force 45 "1", the object function is controllable even without inquiring it of the user. Further, the storage section 20 has pre-stored the process content of the effect that with the compulsory force 45 "2", an execution of the object function has to be inquired of the user before execution.

In FIG. 17, the processes in the step S102 to step S107 are similar to the processes shown in FIG. 6. In this embodiment, the mobile telephone 10 executes a determination process based upon the compulsory force 45 described in the function control information 40 before executing the processes (step S108 and step S109) for controlling the function, being a control object, described in the function control information 40.

The compulsory force determinator 18 determines whether the value of the compulsory force 45 of the function control information 40 is "1" or "2" (step S107c). And, the mobile telephone 10 extracts and executes a process content corresponding to the value of the compulsory force 45 from the storage section 20. That is, in a case where compulsory force determinator 18 has determined that the value of the compulsory force 45 is "1", the mobile telephone 10 executes the control of the function, being a control object, as it is, irrespective of a user's intention. Further, in a case where compulsory force determinator 18 has determined that the value of the compulsory force 45 is "2", the mobile telephone 10 displays a window screen for urging the user for an input instruction for permitting an execution of the function control. Giving an input instruction from the window screen enables the user to select permission/refusal of an execution of the function control.

The mobile telephone 10 determines whether or not an input instruction for permitting an execution of the function control has been given by the user (step S107d). When the mobile telephone 10 determines that an input instruction for permitting an execution of the function control has been given, it executes the control of the function, being a control object (step S108 and step S109). When the mobile telephone 10 determines that the value of the compulsory force 45 of the function control information 40 is "2" and determines that an input instruction for permitting an execution of the function control has not been given by the user, it scraps the function control information 40 (step S106).

As mentioned above, in accordance with this embodiment, the terminal device (the mobile telephone 10) includes situation analysis means (the compulsory force determinator 18) for deciding whether or not an execution permission of the function control is requested of the user of the external request type function control device based upon evaluation information (the compulsory force 45) described in the function control information 40. Accordingly, it is possible to automatically execute the function control by the received function control information 40, and also possible to execute only the function control permitted by the user.

Embodiment 6

Next, a sixth embodiment of the present invention will be explained by making a reference to the accompanied drawings. In this embodiment, a configuration of the external request type function control system is similar to the configuration shown in FIG. 1; however this embodiment differs from the first embodiment in the content of the function control information 40 and the configuration of the mobile telephone 10.

Figure 18:
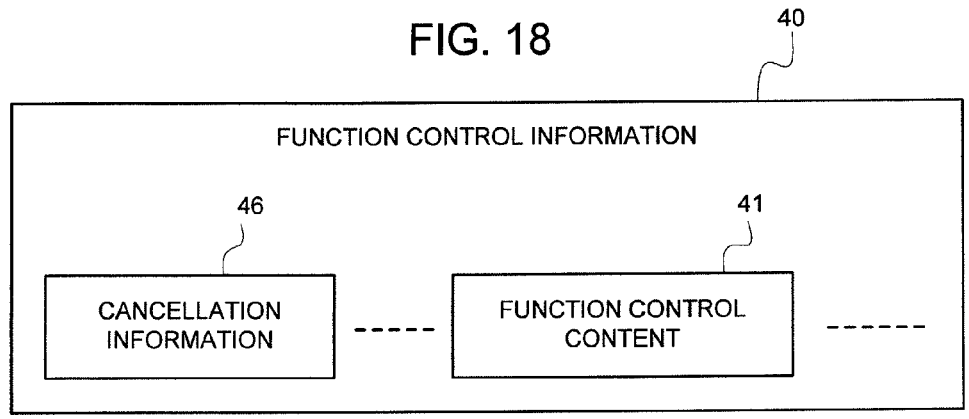
FIG. 18 is an explanatory view illustrating yet another example of the function control information 40.

FIG. 18 is an explanatory view illustrating yet another example of the function control information 40. As shown in FIG. 18, the function control information 40 includes cancellation information 46 indicating a condition under which an execution of the function control is cancelled in addition to the function control content 41 shown in FIG. 3. The cancellation information 46 is, for example, a condition of a time and location, a condition based upon the situation of the surroundings such as a sound being noisy, a condition of an age and gender of the user, and a condition based upon an ability and an operational situation of the mobile telephone 10, or the like. Additionally, the cancellation information 46 may be described in plural within one kind of the function control information 40.

Figure 19:
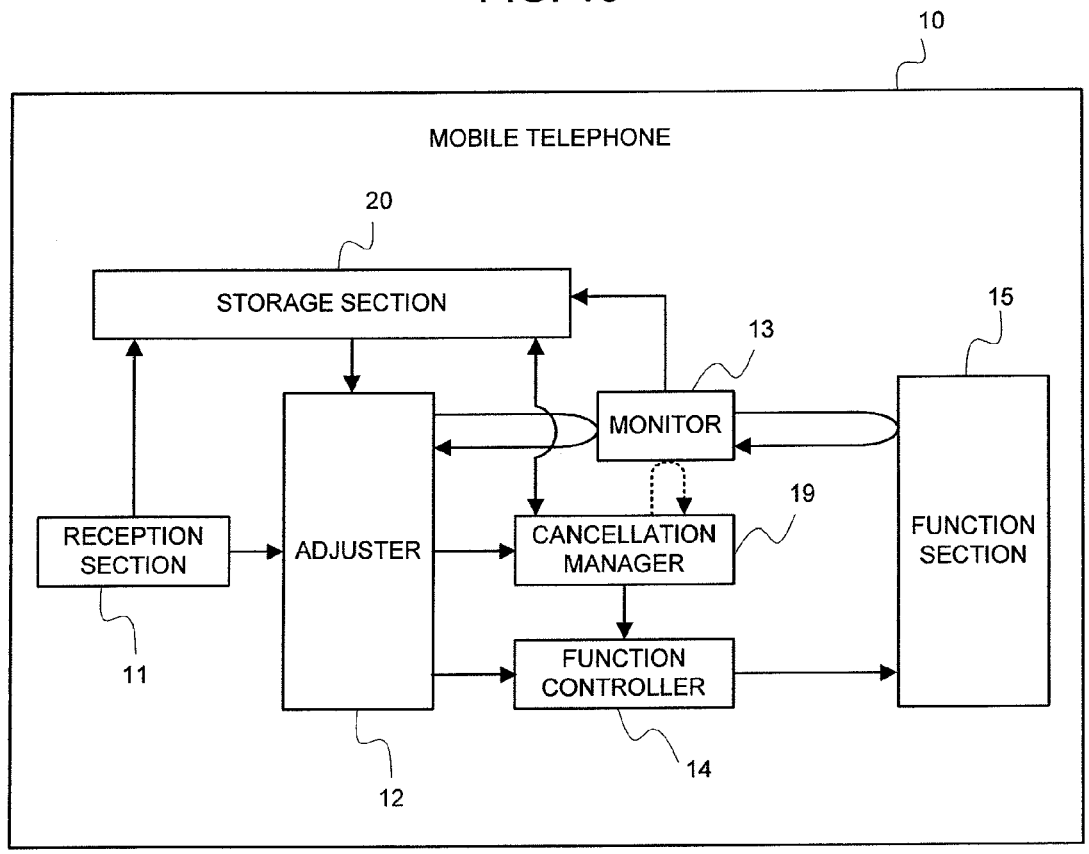
FIG. 19 is a block diagram illustrating yet another configuration example of the mobile telephone 10.

FIG. 19 is a block diagram illustrating yet another configuration example of the mobile telephone 10. As shown in FIG. 19, this embodiment differs from the first embodiment in a point that the mobile telephone 10 includes a cancellation manager 19 in addition to the components shown in FIG. 5. Further, this embodiment differs from the first embodiment in the content of the information that is stored in the storage section 20. Additionally, FIG. 19 has an identical code affixed to an element identical to the component shown in FIG. 5.

The cancellation manager 19 causes the storage section 20 to store the cancellation information 46 described in the function control information 40 in executing the function control based upon the function control information 40. Further, the cancellation manager 19 determines whether or not the state of the mobile telephone 10 meets the condition of the cancellation information 46. Further, when the cancellation manager 19 determines that the state of the mobile telephone 10 meets the condition of the cancellation information 46 described in the function control information 40, it cancels an execution of the function based upon the function control information 40.

The storage section 20 stores the cancellation information 46 described in the function control information 40 in executing the function control base upon the function control information 40 in addition to the information content shown in the first embodiment.

Figure 20:
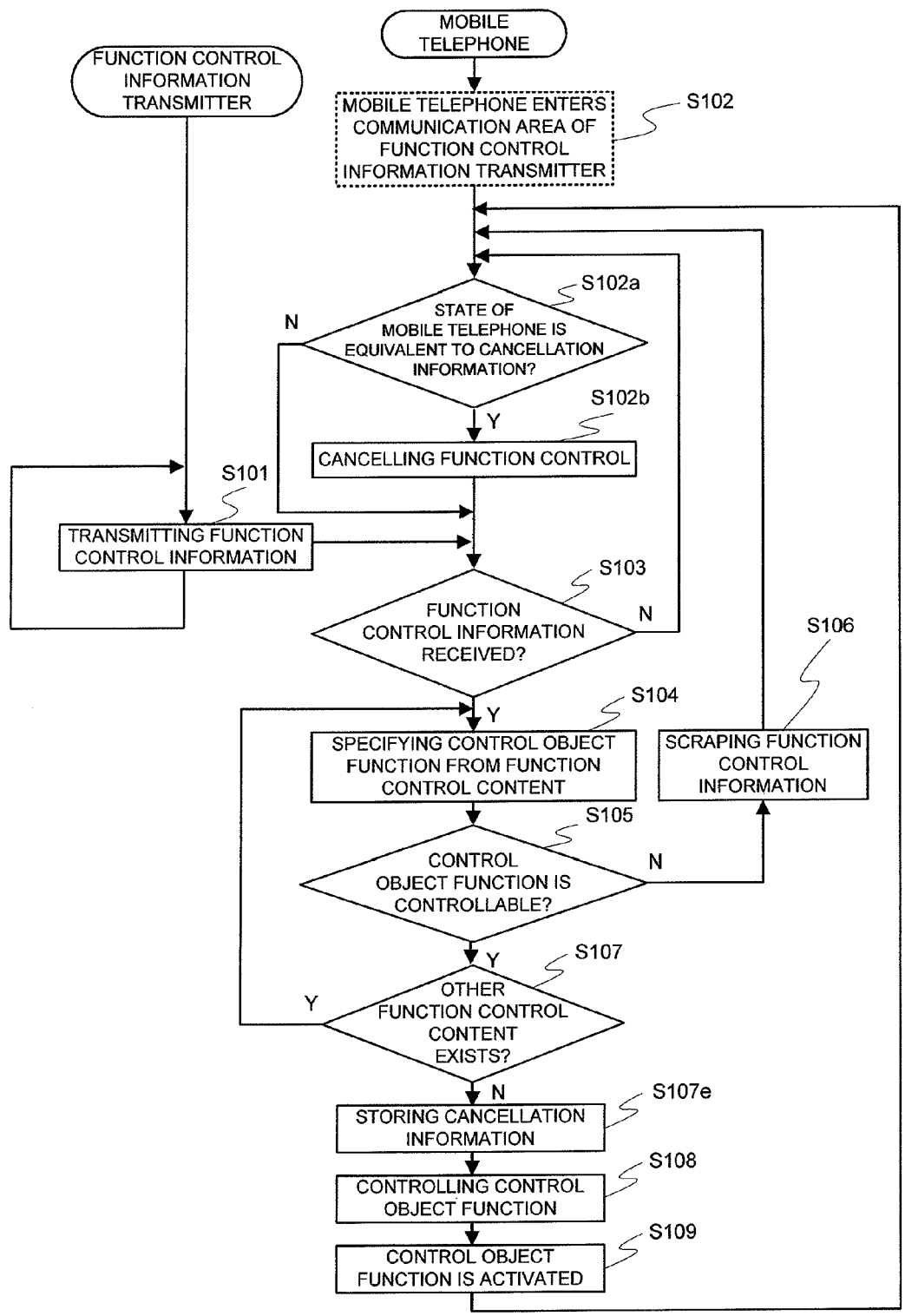
FIG. 20 is a flowchart illustrating yet another example of the function control process that the external request type function control system executes.

Next, an operation will be explained. FIG. 20 is a flowchart illustrating yet another example of the function control process that the external request type function control system executes. As shown in FIG. 20, in this embodiment, a process (step S107e) of storing the cancellation information 46 of the function control, a process (step S102a) of determining whether or not the state of the mobile telephone 10 is equivalent to the cancellation information 46, and a process (step S102b) of canceling the function control are included in addition to the processes shown in FIG. 6. Additionally, FIG. 20 has an identical step number affixed to the process identical to the process shown in FIG. 6.

The function control information transmitter 30 repeatedly transmits the function control information 40 that the information filer 32 stores (step S101). In this embodiment, the function control information 40 has the cancellation information 46 described indicating a condition under which the control of the function is cancelled in addition to the function control content 41 shown in the first embodiment. The cancellation information 46 is, for example, a condition of a lapse time since controlling the function and a location, a condition based upon the situation of the surroundings such as a sound being noisy, a condition of an age and gender of the user, a condition based upon an ability and an operational situation of the mobile telephone 10, and a condition based upon the process executed in the past by the mobile telephone 10.

In FIG. 20, the processes in the step S102, and the step S103 to step S107 are similar to the processes shown in FIG. 6. In this embodiment, the cancellation manager 19 causes the storage section 20 to store the cancellation information 46 of the function control information 40 (step S107e) before executing the processes (step S108 and step S109) for controlling the function, being a control object, described in the function control information 40.

The cancellation manager 19 regularly detects whether or not the state of the mobile telephone 10 is equivalent to the cancellation information 46 at a pre-decided predetermined time period (step S102a). That is, the cancellation manager 19 regularly determines whether or not the state of the mobile telephone 10 meets the condition of the cancellation information 46. When the cancellation manager 19 determines that the state of the mobile telephone 10 is equivalent to the cancellation information 46 (meets the condition of the cancellation information 46), it cancels an execution of the function control that is currently being activated, and erases the corresponding function control information 40 that the storage section 20 stores (step S102b). When the cancellation manager 19 determines that the state of the mobile telephone 10 does not meet the condition of the cancellation information 46, the mobile telephone 10 does not cancel an execution of the function control.

In the step S102a, for example, in a case where the condition of a time is included in the cancellation information 46, the cancellation manager 19 inputs the current time information by inquiring it of the timer section that the mobile telephone 10 includes, and determines whether or not the current time meets the cancellation information 46. Further, in a case where the condition based upon the situation of the surrounding is included in the cancellation information 46, the cancellation manager 19 employs a sensor value (for example, a sound volume) of a sensor that the mobile telephone 10 includes, thereby to determine whether or not the cancellation information 46 is met. Further, in a case where the condition based upon an age of the user is included in the cancellation information 46, the cancellation manager 19 determines whether or not the cancellation information 46 is met based upon profile information that the storage section 20 pre-stores. Further, in a case where the condition based upon the operational situation of the mobile telephone 10 is included in the cancellation information 46, the cancellation manager 19 determines the operational situation of each function by inquiring it of the monitor 13, thereby to determine whether or not the cancellation information 46 is met.

In the step S102a, the cancellation manager 19 can acquire the time information from a timer of the mobile telephone 10, information of the location from a base station of the mobile telephone 10 and a GPS signal, the information of the situation of the surroundings by employing sensors such as a microphone and a camera, and an age and gender of the user by causing a memory to store it, respectively. Additionally, in a case where a plurality of the conditions are included, the cancellation manager 19 determines and verifies whether or not all of the conditions are met.

Embodiment 7

Figure 21:
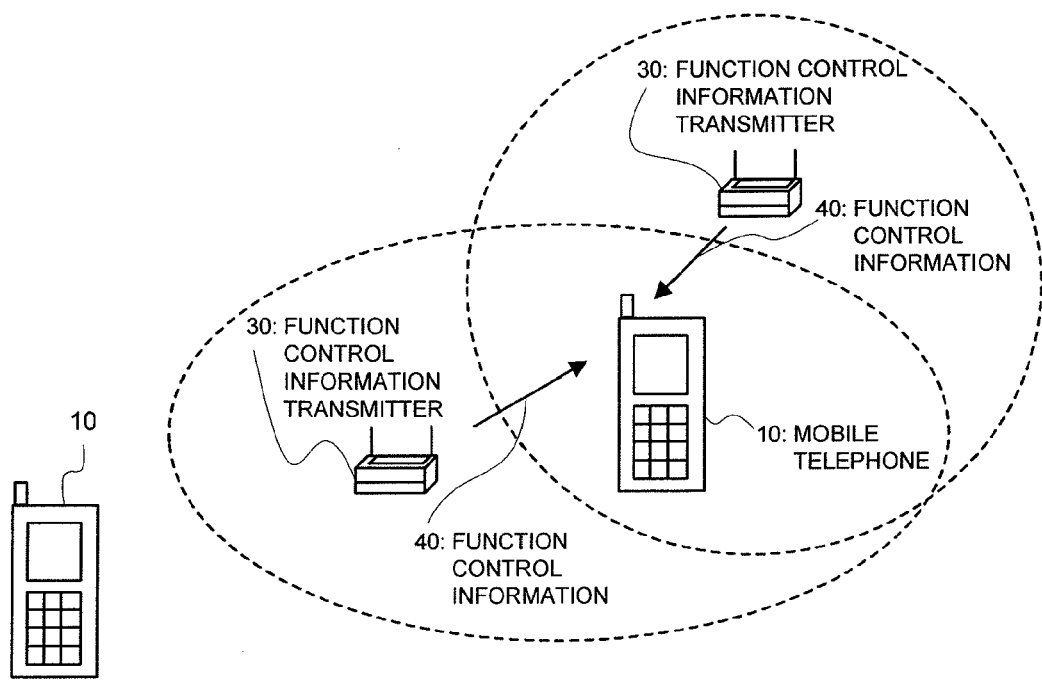
FIG. 21 is an explanatory view illustrating another configuration example of the external request type function control system.

Next, a seventh embodiment of the present invention will be explained by making a reference to the accompanied drawings. FIG. 21 is an explanatory view illustrating another configuration example of the external request type function control system. This embodiment differs from the first embodiment in a point that the mobile telephone 10 belongs to a plurality of areas (a region in which plural areas are overlapped with each other) in which communication can made simultaneously, and that the function control information transmitter 30 that transmits the different the function control information 40 exists in plural.

Figure 22:
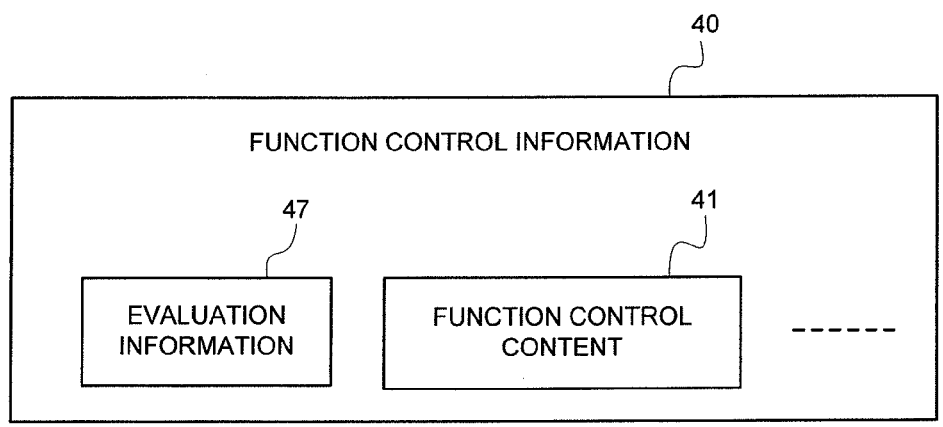
FIG. 22 is an explanatory view illustrating yet another example of the function control information 40.

FIG. 22 is an explanatory view illustrating yet another example of the function control information 40. As shown in FIG. 22, the function control information 40 includes evaluation information 47 indicating validity of the function control in addition to the function control content 41 shown in FIG. 3. Additionally, the evaluation information 47 may be signified with the priority degree 42 shown in the second embodiment and the compulsory force 45 shown in the fifth embodiment.

Further, in this embodiment, a configuration of the mobile telephone 10 is similar to the configuration of the mobile telephone 10 in the fourth embodiment shown in FIG. 13. In this embodiment, the process content of the situation analyzer 17 is different from that of the fourth embodiment.

In this embodiment, in having received plural kinds of the function control information 40, the situation analyzer 17 decides an order of the process based upon the evaluation information 47 of the function control information 40. Specifically, the storage section 20 has pre-stored a correspondence relation between the evaluation information 47 and the order of the process, so the situation analyzer 17 decides the order of the processes based upon a correspondence relation that the storage section 20 stores. Further, the function control information has the evaluation information 47 described in a format (for example, a priority order) that allows the order of the evaluation information 47 itself to be grasped, so the situation analyzer 17 may decide the order of the process based upon the order that is shown in the evaluation information 47.

Figure 23:
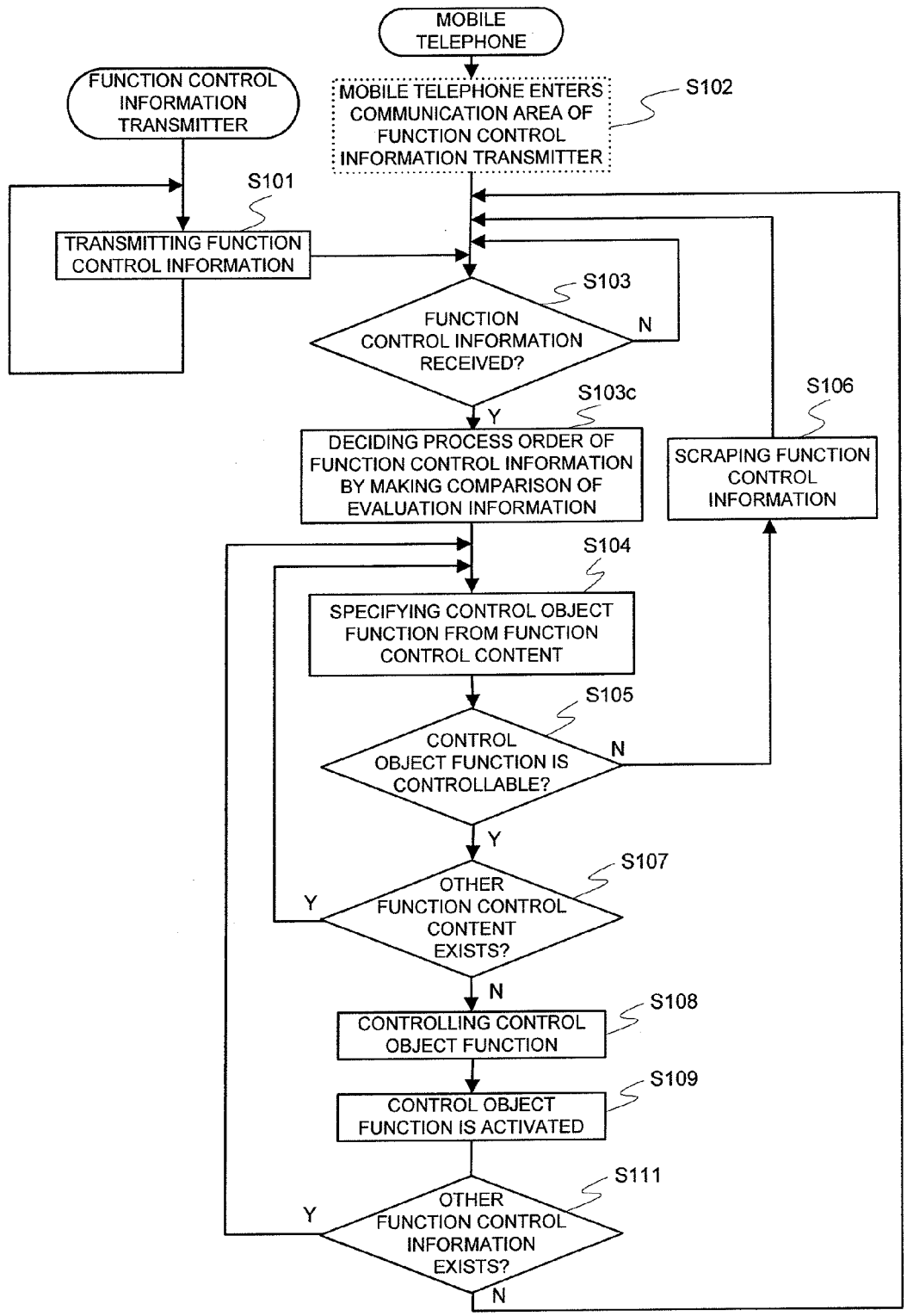
FIG. 23 is a flowchart illustrating yet another example of the function control process that the external request type function control system executes.

Next, an operation will be explained. FIG. 23 is a flowchart illustrating yet another example of the function control process that the external request type function control system executes. As shown in FIG. 23, in this embodiment, a process (step S103c) of, in a case of having received plural kinds of the function control information 40, deciding the process order based upon the evaluation information 47 of the function control information 40, and a process (step S111) of determining an execution of the process of the next function control information 40 are included in addition to the processes shown in FIG. 6. Additionally, FIG. 23 has an identical step number affixed to the process identical to the process shown in FIG. 6.

The function control information transmitter 30 repeatedly transmits the function control information 40 that the information filer 32 stores (step S101). In this embodiment, the function control information 40 has the evaluation information 47 described indicating validity of the function control in addition to the function control content 41 shown in the first embodiment. The evaluation information 47 is, for example, a credit degree of the sender of the function control information 40, a recommendation degree in word-of-mouth information, or the like. Additionally, the evaluation information 47, which is comparable information enabling superiority/inferiority to be decide, may be information other than the credit degree and the recommendation degree.

When the mobile telephone 10 enters the region in which a plurality of the communication areas are overlapped with each other (step S102) and receives plural kinds of the function control information 40 (step S103), it causes the storage section 20 to store the received all kinds of the function control information 40. The situation analyzer 17 compares each evaluation information 47 of the received respective kinds of the function control information 40 with the other, thereby to decide an order of the process by the function control information 40 (step S103c).

For example, in a case where the function control information has the evaluation information 47 described in a format that allows the order of the evaluation information 47 itself to be grasped, for example, in such a manner that the value of the evaluation information 47 is "evaluation: high", and "evaluation: low", respectively, the situation analyzer 17 compares each evaluation information 47 of the function control information 40 with the other as it stands. And, the situation analyzer 17 decides the order in which the process of the function control by the function control information 40 is executed according to the value of the evaluation information 47. Further, for example, in a case where the storage section 20 pre-stores a correspondence relation between the evaluation information 47 and the order of the process, the situation analyzer 17 may employ a correspondence relation that the storage section 20 stores, thereby to decide the order of the process.

Additionally, in a case where the values of the evaluation information 47 of the two compared kinds of the function control information 40 are identical, and cannot be ordered, the situation analyzer 17 may employ yet another comparison information, thereby to decide the order of the process. For example, the situation analyzer 17 may employ a radio wave intensity in having received the function control information 40 from the function control information transmitter 30, a reception order in which the function control information 40 has been received, or the like in addition to the evaluation information 47, thereby to decide the order of the process. Further, it is also acceptable that the situation analyzer 17 obtains a distance between the mobile telephone 10 and the function control information transmitter 30, and employs the obtained distance to the function control information transmitter 30, thereby to decide the order of the process.

Upon deciding the process order, the mobile telephone 10 specifies the control object function of the function control information 40 of which the process order is highest (step S104 to step S107), and controls the function, being a control object, (step S108 and step S109). Further, the mobile telephone 10 determines whether or not the other function control information 40 exists (step S111). In a case where the mobile telephone 10 has determined that the other function control information 40 exists, it repeatedly executes the processes of the step S104 to the step 109 for the function control information 40 of which the process order is second highest.

As mentioned above, in accordance with this embodiment, the function control information 40, which is transmitted from the outside, has the evaluation information 47 described for indicating validity of the function control. And, the terminal device (the mobile telephone 10) includes adjustment means (the situation analyzer 17) for deciding the order of the function control process based upon its evaluation information 47. Accordingly, it is possible to execute the valid process even in a case of having received plural kinds of the function control information 40.

Embodiment 8

Next, an eighth embodiment of the present invention will be explained by making a reference to the accompanied drawings. In this embodiment, a configuration of the external request type function control system is similar to the configuration shown in FIG. 21; however this embodiment differs from the seventh embodiment in the process content of the situation analyzer 17 and the content of the information that the storage section 20 stores. Additionally, in this embodiment, a configuration of the mobile telephone 10 is similar to that of the mobile telephone 10 in the fourth embodiment shown in FIG. 13.

The storage section 20 stores a priority order (hereinafter, referred to as a function priority order) of the process of the function control within the mobile telephone 10 in addition to the information content shown in the first embodiment. In a case of having received plural kinds of the function control information 40, the situation analyzer 17 compares each of the functions described so as to be controlled in line with the respective received function control contents 41 with the other by collating the function priority order that the storage section 20 stores, thereby to determine the order of the process by the function control information 40.

Figure 24:
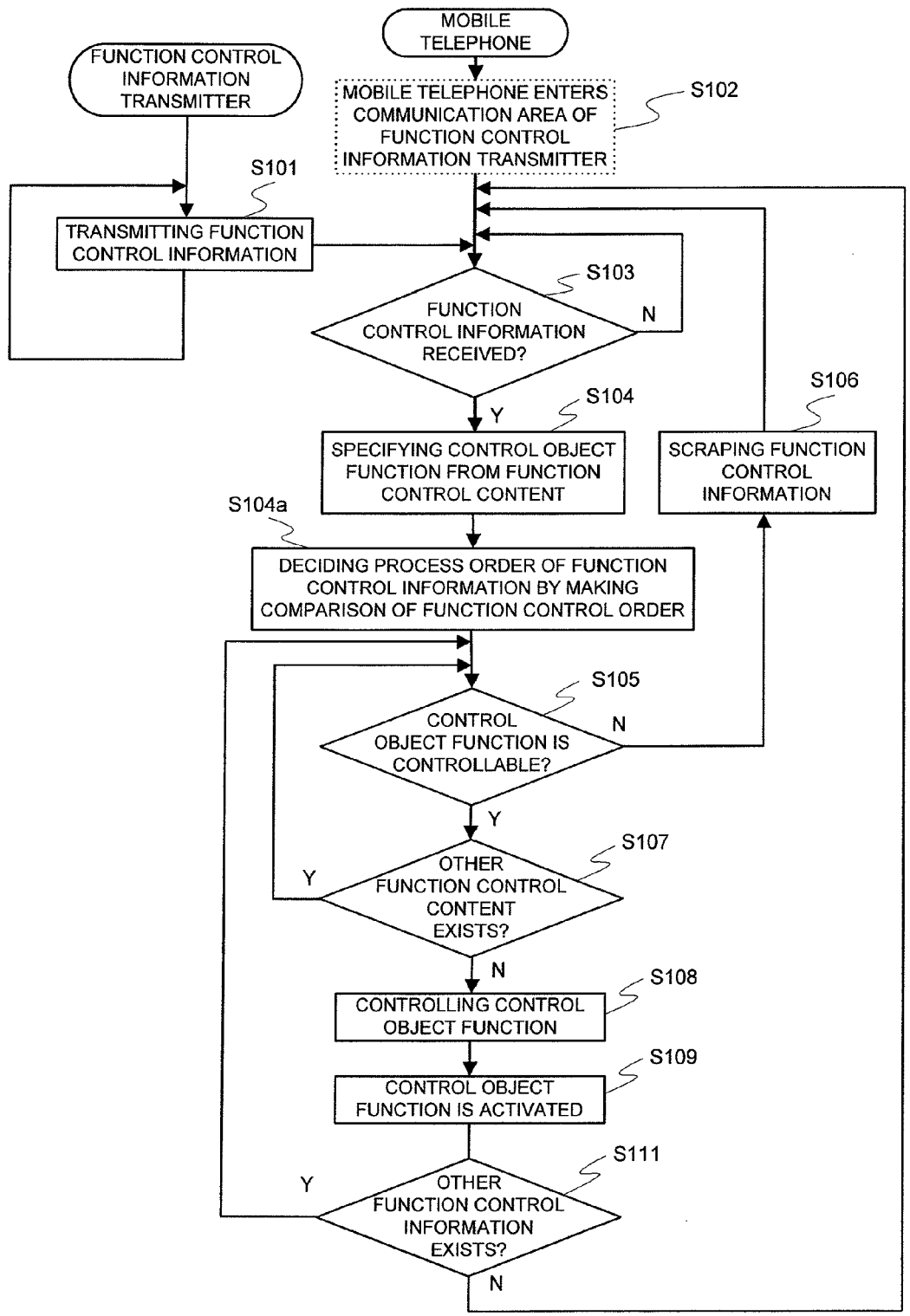
FIG. 24 is a flowchart illustrating yet another example of the function control process that the external request type function control system executes.

Next, an operation will be explained. FIG. 24 is a flowchart illustrating yet another example of the function control process that the external request type function control system executes. As shown in FIG. 24, in this embodiment, a process (step S104a) of deciding the order of the process by the function control information 40, and a process (step S111) of determining the process execution of the next function control information 40 are included in addition to the processes shown in FIG. 6. In the step S104a, in a case of having received plural kinds of the function control information 40, after the situation analyzer 17 specifies the control object function from the function control content 41 of the function control information 40, it collates the function described so as to be controlled in line with each received function control content 41 with the function control order that the storage section 20 stores, thereby to determine the order of the process by the function control information 40. Additionally, FIG. 24 has an identical step number affixed to the process identical to the process shown in FIG. 6.

The order of the process has already been decided for controlling the function of the function section 15, so the storage section 20 has pre-stored the function control order. For example, in a case where a control of setting the mode to a manner mode is given a higher priority than a control of starting a browser, the storage section 20 stores the priority order higher than that of the control for starting the browser as the function control order of the manner mode control. Additionally, the function control order to be stored by the storage section 20 may be updated at a real-time basis depending upon the situation of the mobile telephone 10 etc.

When the mobile telephone 10 enters a region of a plurality of the communication areas in which a plurality of the communication areas are overlapped with each other (step S102), and receives plural kinds of the function control information 40 (step S103), it causes the storage section 20 to store the received all kinds of the function control information 40. Further, the mobile telephone 10 specifies the function, being a control object, based upon the function control content 41 of the received function control information 40 (step S104).

Further, the situation analyzer 17 inquires of the storage section 20 the priority order of the control object function of the respective kinds of the received function control information 40. And, the situation analyzer 17 decides the process order of the function control information 40 according to the function control order that the storage section 20 stores (step S104a).

Upon deciding the process order, the mobile telephone 10 controls the function, being a control object, of the function control information 40 of which the process order is highest (step S105 to step S109). Further, the mobile telephone 10 determines whether or not the other function control information 40 exists (step S111). In a case where the mobile telephone 10 has determined that the other function control information 40 exists, it repeatedly executes the processes of the step S105 to the step 109 for the function control information 40 of which the process order is second highest.

As mentioned above, in accordance with this embodiment, the terminal device (the mobile telephone 10) stores the execution order of the function that is controllable by the function control information 40. And, the terminal device includes adjustment means (the situation analyzer 17) for, in having received plural kinds of plural function control information 40, deciding the process order of the function control information 40 according to the execution order of its function. Accordingly, it is possible to execute the valid process even in a case of having received plural kinds of the function control information 40.

Embodiment 9

Next, a ninth embodiment of the present invention will be explained by making a reference to the accompanied drawings. In this embodiment, an example having the embodiments shown in the first embodiment to the eighth embodiment illustrated more specifically will be explained.

Figure 25:
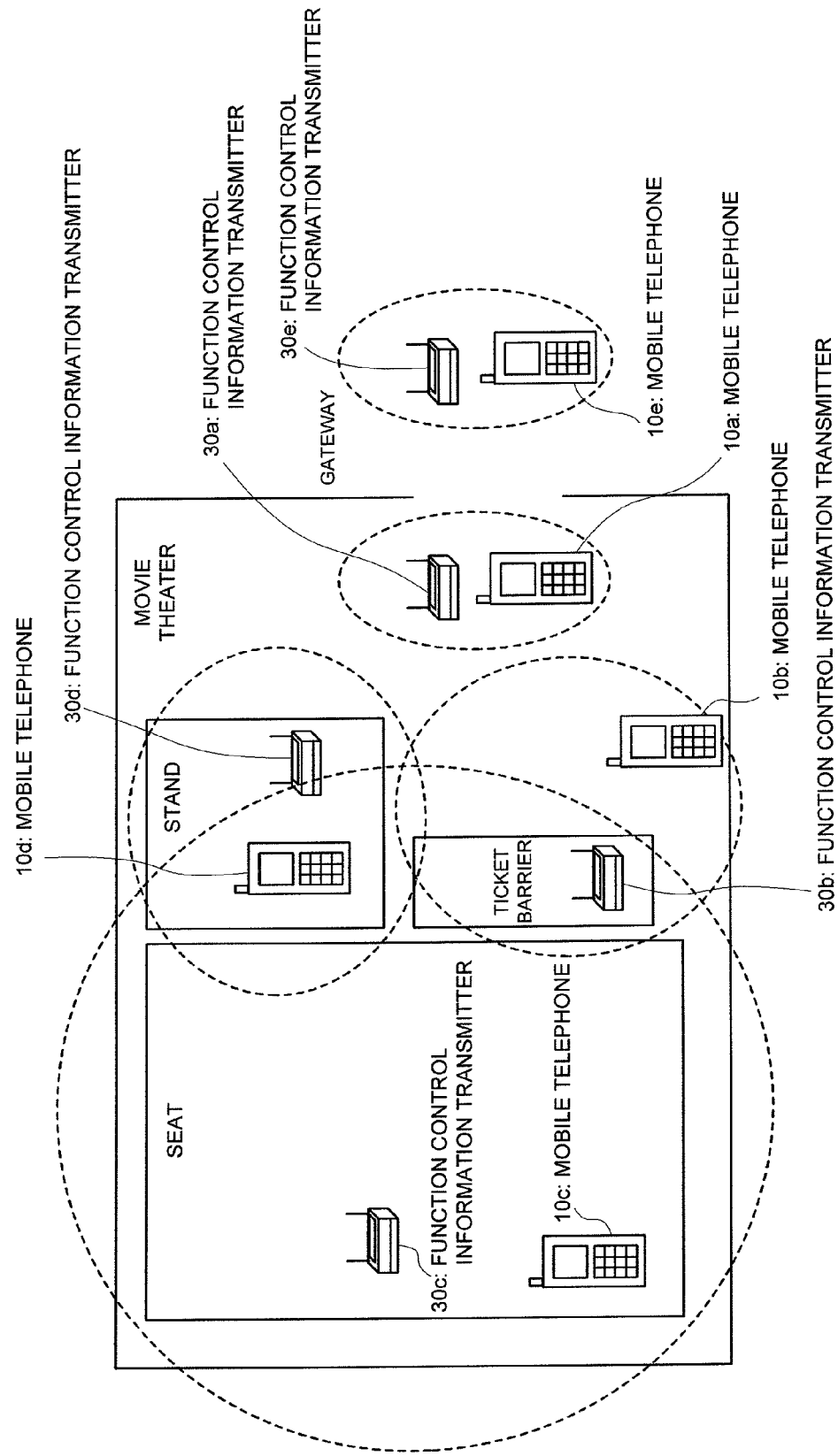
FIG. 25 is an explanatory view illustrating an application environment in the case of having applied the external request type function control system to a movie theater.

FIG. 25 is an explanatory view illustrating an application environment in the case of having applied the external request type function control system to a movie theater. As shown in FIG. 25, the external request type function control system includes a plurality of function control information transmitters 30a, 30b, 30c, 30d, and 30e. Further, in this embodiment, as the user migrates, the mobile telephone 10 sequentially migrates from a position of a mobile telephone 10a to a position of a mobile telephone 10e shown in FIG. 25. Additionally, in this embodiment, in a case of comprehensively expressing the function control information transmitters 30a to 30e, or in a case of pointing to any of the function control information transmitters, it is simply referred to as the function control information transmitter 30.

As shown in FIG. 25, in this embodiment, the function control information transmitters 30 for transmitting the function control information 40 for controlling the function of the mobile telephone 10 are placed in a gateway, a ticket barrier, a seat, and a stand, respectively. The function control information transmitter 30 is, for example, a wireless LAN apparatus, a RFID tag, and a feeble radio wave apparatus.

Figure 26:
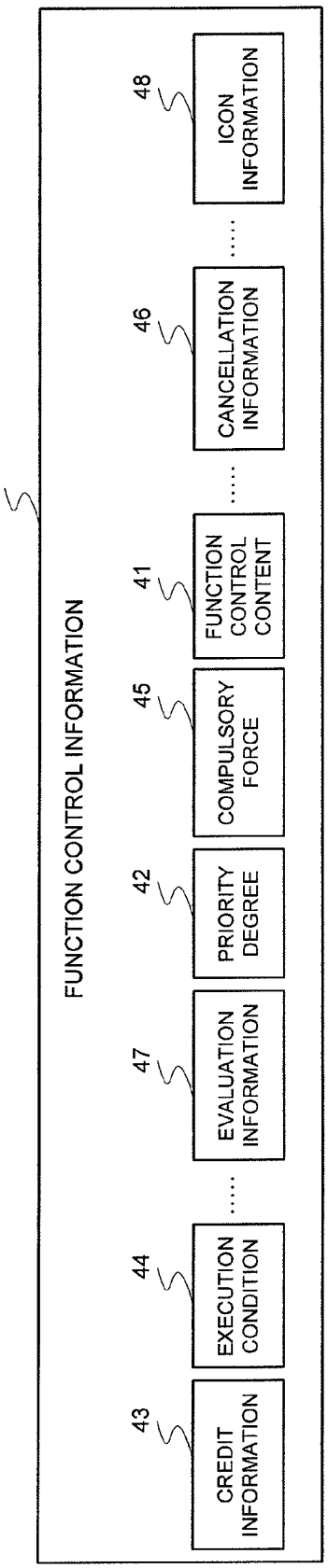
FIG. 26 is an explanatory view illustrating yet another example of the function control information 40.

FIG. 26 is an explanatory view illustrating yet another example of the function control information 40. As shown in FIG. 26, the function control information 40 includes icon information 48 for display an icon for notifying reception of the function control information 40 to the user of the mobile telephone 10 in addition to the information contents shown in FIG. 3, FIG. 7, FIG. 9, FIG. 12, FIG. 15, FIG. 18, and FIG. 22. Additionally, FIG. 25 has an identical code affixed to an element identical to each information element of the function control information 40 shown in FIG. 3, FIG. 7, FIG. 9, FIG. 12, FIG. 15, FIG. 18, and FIG. 22.

FIG. 27 is an explanatory view illustrating an example of the specific contents of function control information 40-a to 40-e that each function control information transmitter 30 transmits.

The function control information transmitter 30a that is placed in a gateway transmits the function control information 40-a. The function control information 40-a includes the condition of the effect that the manner mode has not been set as the execution condition 44. Further, the function control information 40-a includes as the function control content 41 information saying the effect that it is stored that the mode has been set to the manner mode and the function control by this function control information 40-a has been executed. Further, the function control information 40-a includes the priority degree 42 "low", the evaluation information 47 "high", and the compulsory force 45 "normal". Further, the function control information 40-a includes the condition of the effect that the function control is cancelled after four hours since the execution thereof as the cancellation information 46. Further, the function control information 40-a includes information for displaying an icon of a ○○ movie theater a as the icon information 48. Further, the function control information 40-a has the effect that the information sender is a ○○ movie theater described, and has a signature affixed indicating the effect that the function control information 40-a has not been tampered as the credit information 43.

The function control information transmitter 30b that is placed in a ticket barrier transmits the function control information 40-b. The function control information 40-b includes the condition of the effect that the mobile telephone 10 has application software of an electronic ticket installed as the execution condition 44. Further, The function control information 40-b includes information saying the effect that the application software of an electronic ticket is started as the function control content 41. Further, the function control information 40-b includes the priority degree 42 "low", the evaluation information 47 "low", and the compulsory force 45 "normal". Further, the function control information 40-b includes the condition of the effect that the function control information 40-b has not received as the cancellation information 46. Further, the function control information 40-b includes information for displaying an icon of a ○○ movie theater b as the icon information 48. Further, the function control information 40-b has the effect that the information sender is a ○○ movie theater described, and has a signature affixed indicating the effect that the function control information 40-b has not been tampered as the credit information 43.

The function control information transmitter 30c that is placed in a seat transmits the function control information 40-c. The function control information 40-c includes information saying the effect that a camera photographing is prohibited, information saying the effect that a backlight of a liquid crystal is caused to come into a state of non-lighting, and information saying the effect that the mode is set to manner mode as the function control content 41. Further, the function control information 40-c includes the priority degree 42 "high", the evaluation information 47 "high", and the compulsory force 45 "compulsory". Further, the function control information 40-c includes the condition of the effect that the function control information 40-c has not been received as the cancellation information 46. Further, the function control information 40-c includes information for displaying an icon of a ○○ movie theater c as the icon information 48. Further, the function control information 40-c has the effect that the information sender is a ○○ movie theater described, and has a signature affixed indicating the effect that the function control information 40-c has not been tampered as the credit information 43. Additionally, the function control information 40-c does not include the execution condition 44.

The function control information transmitter 30d that is placed in a stand transmits the function control information 40-d. The function control information 40-d includes the condition of the effect that the mobile telephone 10 has application software for a process of settling an account installed as the execution condition 44. Further, the function control information 40-d includes information saying that the application software for a process of settling an account is started as the function control content 41. Further, the function control information 40-d includes the priority degree 42 "low", the evaluation information 47 "low", and the compulsory force 45 "normal". Further, the function control information 40-d includes the condition of the effect that the function control information 40-d has not received as the cancellation information 46. Further, the function control information 40-d includes information for displaying an icon of a ΔΔ stand d as the icon information 48. Further, the function control information 40-d has the effect that the information sender is a ΔΔ stand described, and has a signature affixed indicating the effect that the function control information 40-d has not been tampered as the credit information 43.

One function control information transmitter 30e is additionally mounted in a gateway apart from the function control information transmitter 30a. One function control information transmitter 30e that is additionally placed in a gateway transmits the function control information 40-e. The function control information 40-e includes the condition of the effect that the function control information 40-a has been executed as the execution condition 44. Further, The function control information 40-e includes information saying the effect that the manner mode is cancelled, information saying the effect that the effect that the function control information 40-a has been executed is erased, and information saying the effect that a discount ticket of a next-time movie show is distributed as the function control content 41. Further, the function control information 40-e includes the priority degree 42 "high", the evaluation information 47 "high", and the compulsory force 45 "normal". Further, the function control information 40-e includes the condition of the effect that the function control information 40-e has not been received as the cancellation information 46. Further, the function control information 40-e includes information for displaying an icon of a ○○ movie theater e as the icon information 48. Further, the function control information 40-e has the effect that the information sender is a ○○ movie theater described, and has a signature affixed indicating the effect that the function control information 40-e has not been tampered as the credit information 43.

Figure 28:
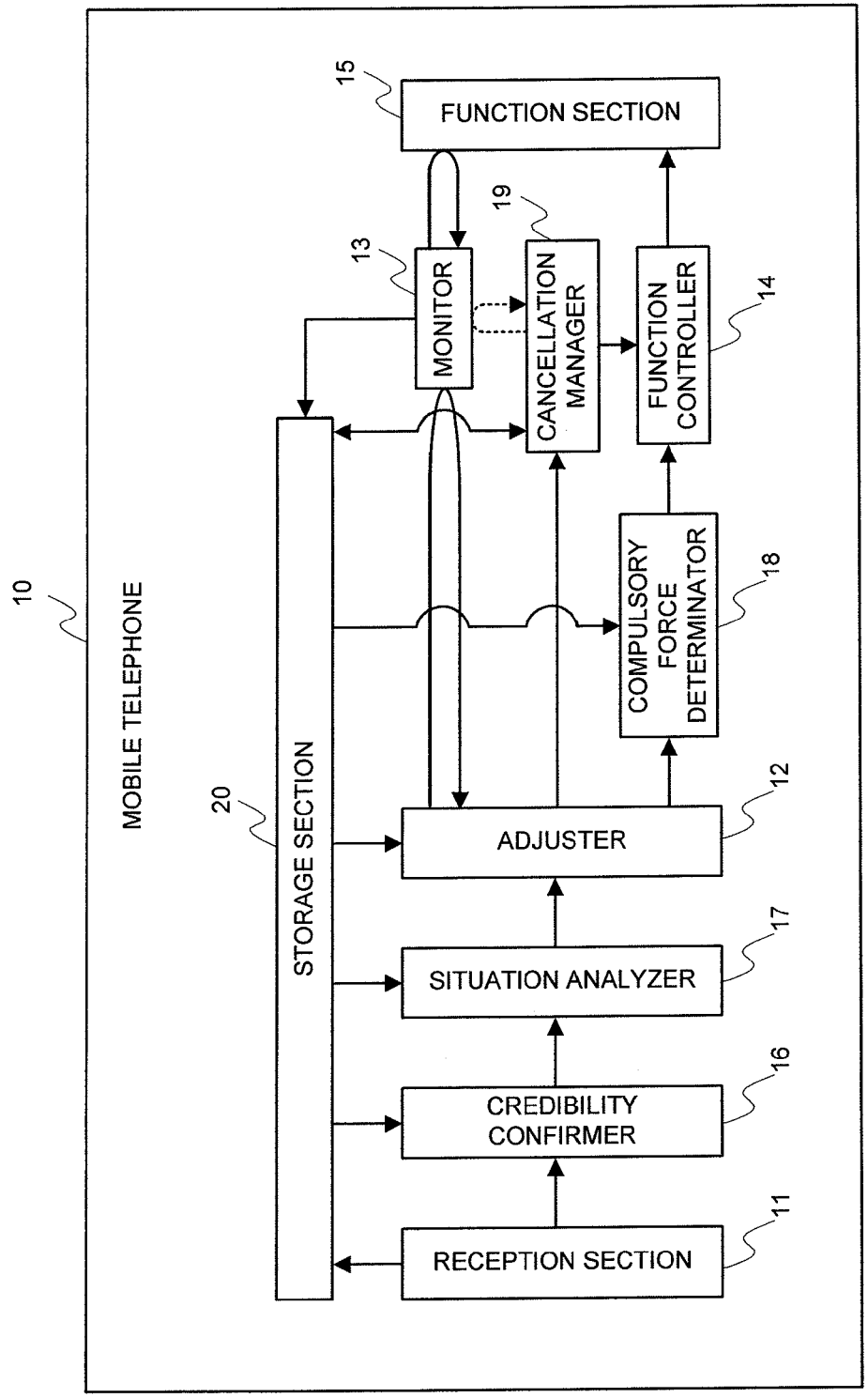
FIG. 28 is a block diagram illustrating yet another configuration example of the mobile telephone 10.

FIG. 28 is a block diagram illustrating yet another configuration example of the mobile telephone 10. A configuration of the mobile telephone 10 shown in FIG. 28 is equivalent to the configuration obtained by all combining each component shown in FIG. 5, FIG. 10, FIG. 13, FIG. 16, and FIG. 19. Additionally, FIG. 28 has an identical code affixed to an element identical to the component shown in FIG. 5, FIG. 10, FIG. 13, FIG. 16, and FIG. 19. Further, in this embodiment, the mobile telephone 10 includes a function of setting the manner mode, and a camera. Further, the mobile telephone 10 has the application software of an electronic ticket and the application software for a process of settling an account mounted (installed).

The storage section 20 of the mobile telephone 10 stores an encryption key corresponding to the sender. Further, the storage section 20 stores the effect that with a relation between the priority degree 40 of the function control information 40 and the current control source of the function, "the value "high" of the priority degree 40", "a user's operation", "the value "low" of the priority degree 42", and "no" are high in its order in terms of the priority degree. Further, the storage section 20 stores the effect that the value "high" of the evaluation information 47 is higher than the value "low" in terms of evaluation. Further, the storage section 20 stores the effect that with the value "compulsory" of the compulsory force 45, the function control is executable even without inquiring it of the user. Further, the storage section 20 stores the effect that with the value "normal" of the compulsory force 45, the function control cannot be executed without a user's permission.

Additionally, a function of each component of the mobile telephone 10 other than the storage section 20 is similar to the function shown in the first embodiment to the eighth embodiment.

Figure 29:
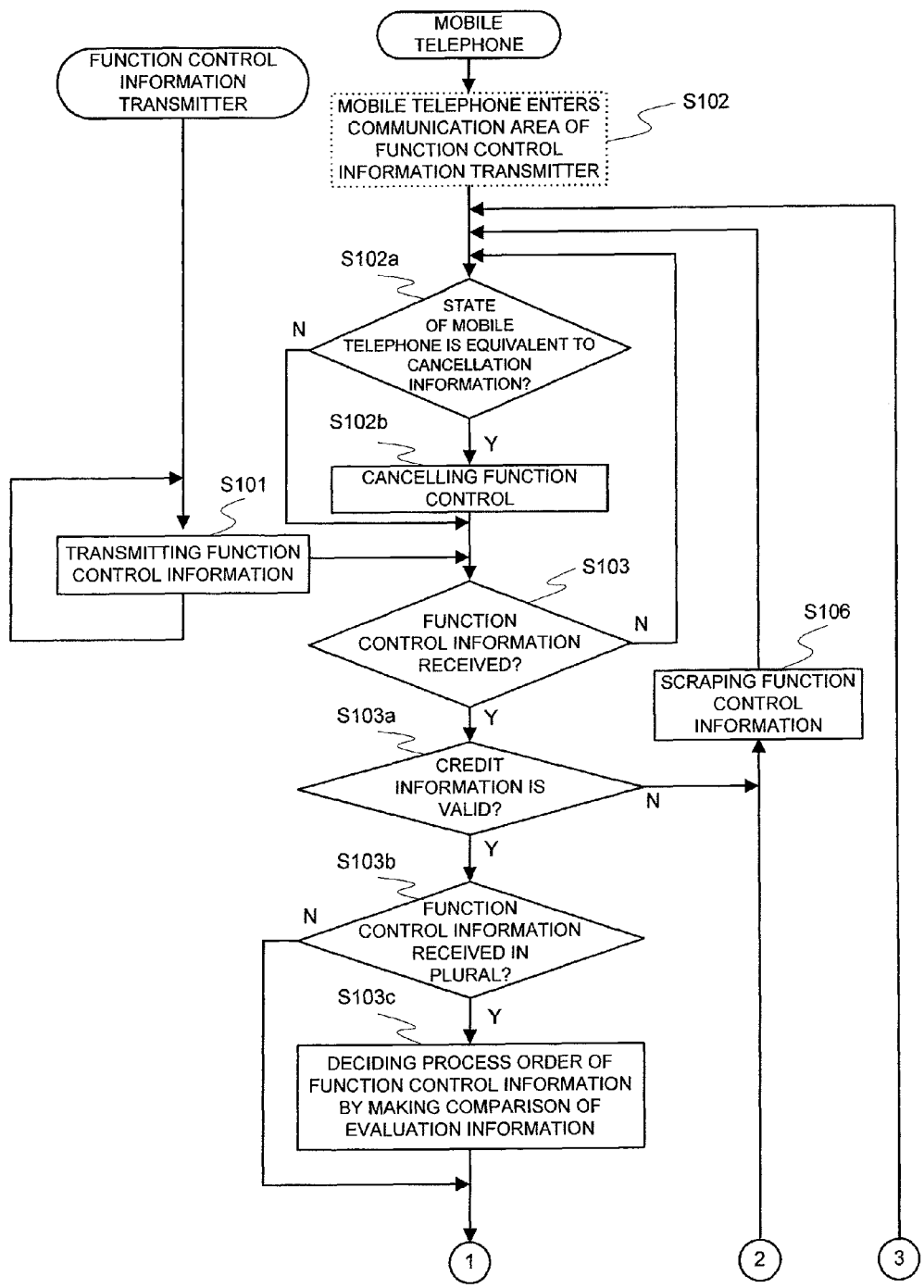
FIG. 29 is a flowchart illustrating yet another example of the function control process that the external request type function control system executes.
Figure 30:
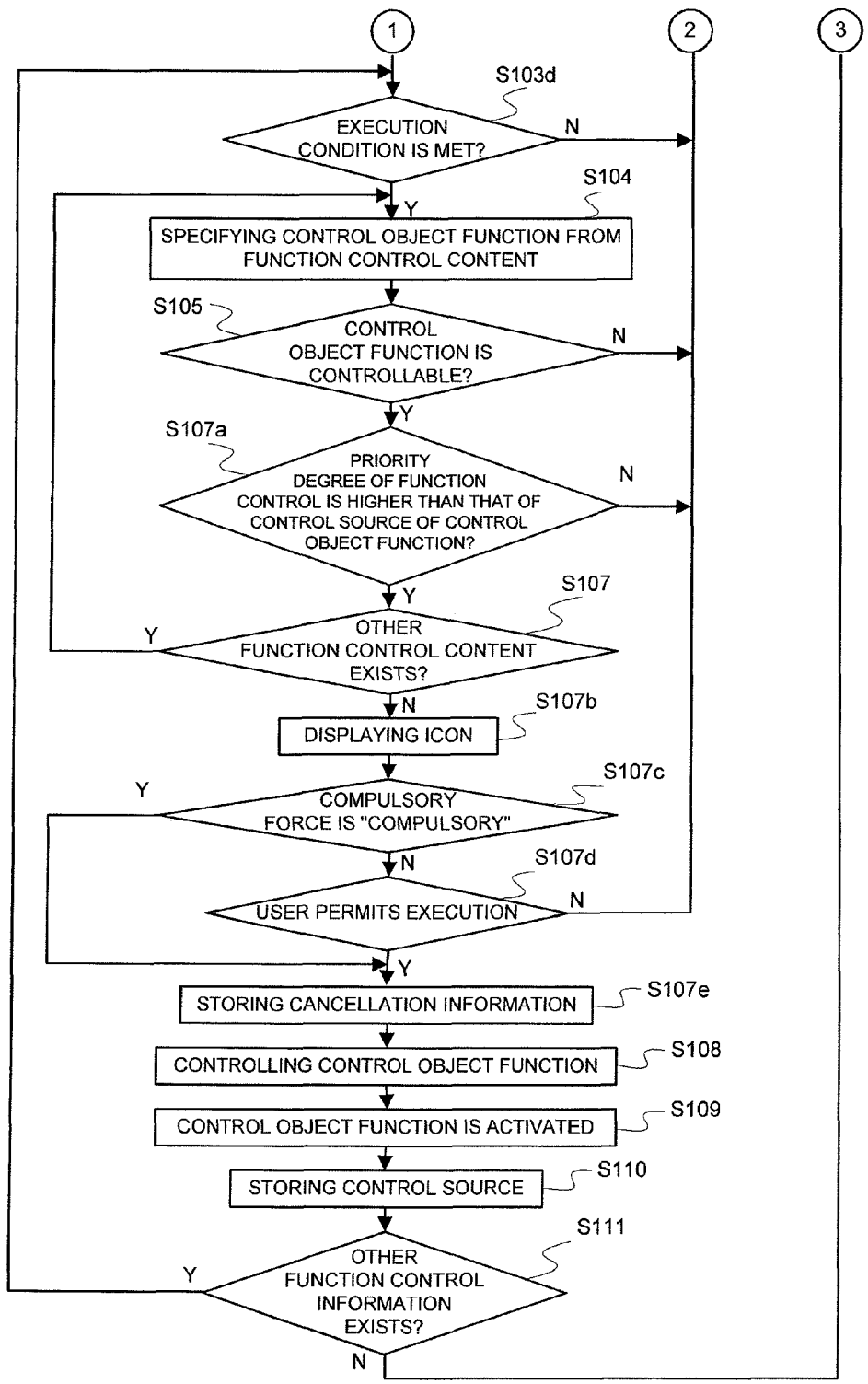
FIG. 30 is a sequel to the flowchart of the function control process shown in FIG. 29.

Next, an operation will be explained. Each of FIG. 29 and FIG. 30 is a flowchart illustrating yet another example of the function control process that the external request type function control system executes. As shown in FIG. 29 and FIG. 30, in this embodiment, a process (step S103b) of determining whether or not the function control information 40 has been received in plural, and a process (step S107b) of displaying an icon are included in addition to the processes shown in FIG. 6, FIG. 11, FIG. 14, FIG. 17, FIG. 20, and FIG. 23. Additionally, FIG. 29 and FIG. 30 have an identical step number affixed to the process identical to the process shown in FIG. 6, FIG. 11, FIG. 14, FIG. 17, FIG. 20, and FIG. 23. Hereinafter, the processes in the case that the mobile telephone 10 sequentially migrates to a position of the mobile telephone 10a, a position of the mobile telephone 10b, a position of the mobile telephone 10c, a position of the mobile telephone 10d, and a position of the mobile telephone 10e shown in FIG. 25 will be explained, respectively.

In this embodiment, it is assumed that when the user has arrived at an entrance to a movie theater at the first time, the mobile telephone 10 is in a state where no operation is performed with an electric power switched on. The function control information transmitter 30a repeatedly transmits the function control information 40-a consecutively and intermittently. Further, the function control information transmitter 30b repeatedly transmits the function control information 40-b consecutively and intermittently. Further, the function control information transmitter 30c repeatedly transmits the function control information 40-c consecutively and intermittently. Further, the function control information transmitter 30d repeatedly transmits the function control information 40-d consecutively and intermittently. Further, the function control information transmitter 30e repeatedly transmits the function control information 40-e consecutively and intermittently (step S101).

An operation in the case that the user arrives at an entrance to a movie theater at the first time and the mobile telephone 10 is located at a position of the mobile telephone 10a in the vicinity of a gateway of a movie theater shown in FIG. 25 will be explained. When the mobile telephone 10 enters a communication area of the function control information transmitter 30a (step S102), the reception section 11 of the mobile telephone 10 employs communication means (for example, another antenna and transmission/reception section) other than the communication means that is employed for making a call, or the like, thereby to receive the function control information 40-a from the function control information transmitter 30a (step S103). And, the reception section 11 causes the storage section 20 to store the received function control information 40-a.

The credibility confirmer 16 verifies credit information 43 "a sender: a signature of a ○○ movie theater", thereby to determine whether or not the credit information 43 is valid (step S103a). Specifically, the credibility confirmer 16 employs a public key encryption technology etc. to authenticate the credit information 43 based upon an encryption key corresponding to "sender: of a ○○ movie theater" that the storage section 20 stores, and verifies existence of the tampering of the sender and the content of the function control information 40-a. In a case where the credibility confirmer 16 has failed in the authentication and has determined that a verification result is not correct, the mobile telephone 10 scraps the function control information 40-a (step S106).

Further, the mobile telephone 10 determines whether or not the function control information 40 has been received in plural (step S103b). In a case where the mobile telephone 10 has determined that the function control information 40 has been received in plural, the situation analyzer 17 inquires of the storage section 20 the order of the process that corresponds to the evaluation information 47 of respective kinds of the function control information 40, thereby to decide the order of the process (step S103c).

The situation analyzer 17 of the mobile telephone 10 determines and verifies whether or not the state of the mobile telephone 10 meets the execution condition 44 of the function control in the descending order, to begin with the function control information 40 of which the process priority is highest (step S103d). In this example, as shown in FIG. 27, the execution condition 44 of the function control information 40-a is that "the manner mode has not been set". The mobile telephone 10 is in a state of leaving the electric power switched on, whereby upon inquiring of the monitor 13, the situation analyzer 17 receives the effect that the manner mode has not been set. Accordingly, in this example, the situation analyzer 17 determines that the state of the mobile telephone 10 meets the condition. Additionally, in a case where the condition is not met in the step S103b, the mobile telephone 10 scraps the function control information 40-a (step S106).

When the situation analyzer 17 determines that the execution condition 44 is met, the adjuster 12 specifies the control object function (step S104). In this example, the adjuster 12 decides specifically that the control object function is a function of setting the manner mode and a function of recording an execution of the function control information 40-a based upon the function control information 40-a shown in FIG. 27. And, by inquiring of the monitor 13, the adjuster 12 determines whether or not the setting of the manner mode is possible (step S105). In this example, the adjuster 12 determines that the function of setting the manner mode exists, and is controllable.

Next, the situation analyzer 17 compares the priority degree 42 of the function control with the priority degree of the current control source of the control object function (step S107a). In this embodiment, the monitor 13 causes the storage section 20 to store the control source of each function. Further, the storage section 20 has stored a relation as well between the priority degree of the control source and the priority degree 42 of the function control information 40. In this example, the operation of setting the manner mode has not been performed yet, whereby the storage section 20 has not stored the current control source of the manner mode setting function. Accordingly, the situation analyzer 17 determines that the priority degree 42 of the function control information 40-a is higher than the priority degree of the current control source.

Additionally, with "a process of storing an execution of the function control information 40-a", the instructions for it from a plurality of the control sources do not compete with each other, so the situation analyzer 17 does not have to compare each of the priority degrees with the other in terms of "a process of storing an execution of the function control information 40-a". Thus, the situation analyzer 17 determines that the function control of the function control information 40-a is possible.

When the situation analyzer 17 determines that all of the function control contents 41 of the function control information 40-a are controllable, the mobile telephone 10 displays an icon of a ○○ movie theater a based upon the icon information 48 (step S107b), and notifies the effect that the function control information 40-a has been received to the user.

Next, the compulsory force determinator 18 inquires of the storage section 20 a process content corresponding to the compulsory force 45 of the function control information 40-a. In this case, the compulsory force determinator 18 determines whether or not the value of the compulsory force 45 is "compulsory" (step S107c). In this example, the value of the compulsory force is "normal", so the mobile telephone 10 displays the effect that an instruction input of permission/refusal of an execution of the function control is urged, and inquires of the user of the mobile telephone 10 whether or not an execution of the function control is permitted. The mobile telephone 10 determines whether or not an input instruction for permitting an execution has been given by the user (step S107d). In a case where the user does not permit an execution of the function control (it has been determined that an input instruction for permitting an execution has not been given), the mobile telephone 10 scraps the function control information 40-a (step S106).

In a case where the user has permitted an execution of the function control (it has been determined that an input instruction for permitting an execution has been given), the cancellation manager 19 causes the storage section 20 to store the cancellation information 46 "the control is cancelled after four hours" of the function control information 40-a (step S107e). Further, the cancellation manager 19 causes the storage section 20 to store the time when the function, being a control object, is controlled.

And, the mobile telephone 10 controls the control object function (step S108 and step S109). In this case, the mobile telephone 10 sets the mode of the mobile telephone 10 to the manner mode, and causes the storage section 20 to store the effect that the function control has been executed according to the function control information 40-a. Further, the monitor 13 causes the storage section 20 to store the control source having activated the function (step S110). In this case, the monitor 13 causes the storage section 20 to store the priority degree 42 "low" as the control source.

In this state, when the user performs an operation of canceling the manner mode of the mobile telephone 10, the mobile telephone 10 determines the current control source and the user's operation in terms of the priority degree in the step S107a. In this example, the mobile telephone 10 determines that the priority degree of the user's operation is higher than the priority degree "low", being the current control source of the manner mode, based upon the priority degree of the control source that the storage section 20 stores. For this, the user can perform an operation of canceling the manner mode without being effected by the function control by the function control information 40.

Next, an operation in the case that the mobile telephone 10 has migrated to a position of the mobile telephone 10b in the vicinity of a ticket barrier shown in FIG. 25 will be explained. The cancellation manager 19 of the mobile telephone 10 regularly detects whether or not the state of the mobile telephone 10 is equivalent to the condition of the cancellation information 46, which is stored by the storage section 20, at a predetermined time period (step S102a). In a case where the cancellation manager 19 has determined that it is equivalent to cancellation information 46 (it meets the condition), it cancels an execution of the function control (step S102b).

In this example, the storage section 20 has stored the cancellation information 46 "after four hours" of the function control information 40-a, whereby the cancellation manager 19 can verify whether or not the state of the mobile telephone 10 is equivalent to the condition of the cancellation information 46 by employing the time when the function control by the function control information 40-a has been executed, and time information of a timer of the mobile telephone 10. Additionally, in this example, an operation will be explained on the assumption that four hours have not elapsed since an execution of the function control by the function control information 40-a and the function control by the function control information 40-a has not been canceled yet.

When the mobile telephone 10 enters the communication area of the function control information transmitter 30b (step S102), the reception section 11 of the mobile telephone 10 employs communication means other than the communication means that is employed for making a call, thereby to receive the function control information 40-b from the function control information transmitter 30b (step S103). And, the reception section 11 causes the storage section 20 to store the received function control information 40-b.

The credibility confirmer 16 verifies credit information 43 "a sender: a signature of a ○○ movie theater", thereby to determine whether or not the credit information 43 is valid (step S103a). Specifically, the credibility confirmer 16 employs a public key encryption technology etc. to authenticate the credit information 43 based upon an encryption key corresponding to "sender: of a ○○ movie theater" that the storage section 20 stores, and verifies existence of the tampering of the sender and the content of the function control information 40-b. In a case where the credibility confirmer 16 has failed in the authentication and has determined that a verification result is not correct, the mobile telephone 10 scraps the function control information 40-b (step S106).

When the credibility confirmer 16 has determined that a verification result is correct, the situation analyzer 17 determines and verifies whether or not the state of the mobile telephone 10 meets the execution condition 44 of the function control information 40 (step S103d). In this example, as shown in FIG. 27, the execution condition 44 of the function control information 40-b is that "the electronic ticket application software has been mounted". Upon inquiring of the monitor 13, the situation analyzer 17 receives the effect that the electronic ticket application software has been mounted. Accordingly, in this example, the situation analyzer 17 determines that the state of the mobile telephone 10 meets the condition. Additionally, in a case where the condition is not met in the step S103b the mobile telephone 10 scraps the function control information 40-b (step S106).

When the situation analyzer 17 determines that the execution condition 44 is met, the adjuster 12 specifies the control object function (step S104). In this example, the adjuster 12 decides specifically that the control object function is a function of starting the electronic ticket application software based upon the function control information 40-b shown in FIG. 27. And, by inquiring of the monitor 13, the adjuster 12 determines whether or not the electronic ticket application software is startable (step S105). In this example, the adjuster 12 determines that the application software is startable.

Next, the situation analyzer 17 compares the priority degree 42 of the function control information 40-b with the priority degree of the current control source of the control object function (step S107a). In this embodiment, the monitor 13 causes the storage section 20 to store the control source of each function. Further, the storage section 20 has stored a relation as well between the priority degree of the control source and the priority degree 42 of the function control information 40. In this example, the application software is in a state of having not been started elsewhere, whereby the storage section 20 has not stored the current control source of the start function of the application software. For this, the situation analyzer 17 determines that the priority degree 42 of the function control information 40-b is higher than the priority degree of the current control source. Thus, the situation analyzer 17 determines that the function control of the function control information 40-b is possible.

When the situation analyzer 17 determines that all of the function control contents 41 of the function control information 40-b are controllable, the mobile telephone 10 displays an icon of a ○○ movie theater b based upon the icon information 48 (step S107b), and notifies the effect that the function control information 40-b has been received to the user.

Next, the compulsory force determinator 18 inquires of the storage section 20 a process content corresponding to the compulsory force 45 of the function control information 40-b. In this case, the compulsory force determinator 18 determines whether or not the value of the compulsory force 45 is "compulsory" (step S107c). In this example, the value of the compulsory force is "normal", whereby the mobile telephone 10 displays the effect that an instruction input of permission/refusal of an execution of the function control is urged, and inquires of the user of the mobile telephone 10 whether or not an execution of the function control is permitted. The mobile telephone 10 determines whether or not an input instruction for permitting an execution has been given by the user (step S107d). In a case where the user does not permit an execution of the function control (it has been determined that an input instruction for permitting an execution has not been given), the mobile telephone 10 scraps the function control information 40-b (step S106).

In a case where the user has permitted an execution of the function control (it has been determined that an input instruction for permitting an execution has been given), the cancellation manager 19 causes the storage section 20 to store the cancellation information 46 "while the function control information 40-b is received" of the function control information 40-b (step S107e).

And, the mobile telephone 10 controls the control object function (step S108 and step S109). In this case, the mobile telephone 10 starts the electronic ticket application software. Further, the monitor 13 causes the storage section 20 to store the control source having activated the function (step S110).

In this case, the monitor 13 causes the storage section 20 to store the priority degree 42 "low" as the control source.

The process above makes it possible to use the electronic ticket application software at a ticket barrier even though the user performs no operation. Further, when the user performs an operation of ending the electronic ticket application software, the mobile telephone 10 determines the current control source and the user's operation in terms of the priority degree in the step S107a. In this example, the mobile telephone 10 determines that the priority degree of the user's operation is higher than the priority degree "low", being a current control source of the electronic ticket application software, based upon the priority degree of the control source that the storage section 20 stores. For this, the mobile telephone 10 ends the electronic ticket application software according to the user's operation without being effected by the function control by the function control information 40.

Additionally, it is also possible that the mobile telephone 10 performs a process so that even though the mobile telephone 10 receives the function control information 40 again corresponding to the function control executed once, it does not accept an execution of the function control until a predetermined time elapses.

Next, an operation in the case that the mobile telephone 10 has migrated to a position of the mobile telephone 10c within a seat shown in FIG. 25 will be explained. The cancellation manager 19 of the mobile telephone 10 regularly detects whether or not the state of the mobile telephone 10 is equivalent to the condition of the cancellation information 46, which the storage section 20 stores, at a predetermined time period (step S102a). In a case where the cancellation manager 19 has determined that it is equivalent to the condition of the cancellation information 46 (it meets the condition), it cancels an execution of the function control (step S102b).

In this example, the storage section 20 has stored the cancellation information 46 "after four hours" of the function control information 40-a and the cancellation information 46 "the function control information 40-b has not been received" of the function control information 40-b. The mobile telephone 10 cannot receive the function control information 40-b in a location of the mobile telephone 10c shown in FIG. 25, whereby the cancellation manager 19 cancels the function control by the function control information 40-b. That is, the mobile telephone 10 ends the electronic ticket application software, and erases an icon display of a ○○ movie theater b as well. Further, the mobile telephone 10 erases the function control information 40-b as well stored in the storage section 20. Additionally, in this example, an operation will be explained on the assumption that four hours have not elapsed since an execution of the function control by the function control information 40-a and the function control by the function control information 40-a has not been canceled yet.

When the mobile telephone 10 enters the communication area of the function control information transmitter 30c (step S102), the reception section 11 of the mobile telephone 10 employs communication means other than the communication means that is employed for making a call, thereby to receive the function control information 40-c from the function control information transmitter 30c (step S103). And, the reception section 11 causes the storage section 20 to store the received function control information 40-c.

The credibility confirmer 16 verifies credit information 43 "a sender: a signature of a ○○ movie theater", thereby to determine whether or not the credit information 43 is valid (step S103a). Specifically, the credibility confirmer 16 employs a public key encryption technology etc. to authenticate the credit information 43 based upon an encryption key corresponding to "sender: a ○○ movie theater" that the storage section 20 stores, and verifies existence of the tampering of the sender and the content of the function control information 40-c. In a case where the credibility confirmer 16 has failed in the authentication and has determined that a verification result is not correct, the mobile telephone 10 scraps the function control information 40-c (step S106).

When the credibility confirmer 16 determines that a verification result is correct, the adjuster 12 specifies the control object function (step S104). In this example, the adjuster 12 specifically decides that the control object function is a function of prohibiting the camera photographing, a function of causing a backlight of a liquid crystal to come into a state of non-lighting, and a function of setting the manner mode based upon the function control information 40-c shown in FIG. 27.

At first, by inquiring of the monitor 13, the adjuster 12 determines whether or not a prohibition of the camera photographing is possible (step S105). In this example, the adjuster 12 determines that a prohibition of the camera photographing is possible. Next, the situation analyzer 17 compares the priority degree 42 of the function control information 40-c with the priority degree of the current control source of the control object function (step S107a). In this embodiment, the monitor 13 causes the storage section 20 to store the control source of each function. Further, the storage section 20 has stored a relation as well between the priority degree of the control source and the priority degree 42 of the function control information 40. In this example, the camera is in a state of having not been started yet at the other location, whereby the storage section 20 has not stored the current control source of the camera control function. For this, the situation analyzer 17 determines that the priority degree of the function control information 40-c is higher than the priority degree of the current control source. Thus, the situation analyzer 17 determines that the function control is possible.

Next, the mobile telephone 10 determines whether or not the other function control content 41 exists in the function control information 40-c (step S107), and executes the processes from step S104 to the step S107a for the other function control content 41. By inquiring of the monitor 13, the adjuster 12 determines whether or not the non-lighting of a backlight of a liquid crystal is possible (step S105). In this example, the adjuster 12 determines that the non-lighting of a backlight of a liquid crystal is possible. Next, the situation analyzer 17 compares the priority degree 42 of the function control information 40-c with the priority degree of the current control source of the control object function (step S107a). In this example, the backlight of the liquid crystal is in a state of having not been control-started yet in the other location, whereby the storage section 20 has not stored the current control source of the control function of the backlight. For this, the situation analyzer 17 determines that the priority degree of the function control information 40-c is higher than the priority degree of the current control source. Thus, the situation analyzer 17 determines that the function control by the function control information 40-c is possible.

Further, by inquiring of the monitor 13, the adjuster 12 determines whether or not the manner mode setting is possible (step S105). In this example, the adjuster 12 determines that the manner mode setting is possible. Next, the situation analyzer 17 compares the priority degree 42 of the function control information 40-c with the priority degree of the current control source of the control object function (step S107a). In this example, the storage section 20 stores the function control information 40-a, of which the priority degree 42 is "low", as the current control source of the manner mode setting function. For this, the situation analyzer 17 determines that the priority degree 42 of the function control information 40-c is higher than the priority degree of the current control source. Thus, the situation analyzer 17 determines that the function control is possible.

When the situation analyzer 17 determines that all of the function control contents 41 of the function control information 40-c are controllable, the mobile telephone 10 displays an icon of a ○○ movie theater c based upon the icon information 48 (step S107b), and notifies the effect that the function control information 40-c has been received to the user.

Next, the compulsory force determinator 18 inquires of the storage section 20 a process content corresponding to the compulsory force 45 of the function control information 40-c. In this case, the compulsory force determinator 18 determines whether or not the value of the compulsory force 45 is "compulsory" (step S107c). In this example, the value of the compulsory force is "compulsory", whereby the mobile telephone 10 determines that a permission for executing the function control does not have to be obtained from the user of the mobile telephone 10. Thus, the cancellation manger 19 causes the storage section 20 to store the cancellation information 46 "while the function control information 40-c is received" of the function control information 40-c without obtaining an input instruction for permission by the user (step S107e).

And, the mobile telephone 10 controls the control object function (step S108 and step S109). In this case, the mobile telephone 10 sets the prohibition of the camera photographing, sets the backlight of the liquid crystal to the non-lighting, and sets the mode to the manner mode. Further, the monitor 13 causes the storage section 20 to store the control source having activated the function (step S110). In this case, the monitor 13 causes the storage section 20 to store the priority degree 42 "high" as each control source.

In this state, when the user performs an operation of canceling the manner mode, the mobile telephone 10 determines the current control source and the user's operation in terms of the priority degree in the step S107a. In this example, the mobile telephone 10 determines that the priority degree "high" of the current control source of the manner mode control function is higher than the priority degree of the user's operation based upon the priority degree of the control source that the storage section 20 stores. For this, the user cannot cancel the manner mode.

Next, an operation in the case that the mobile telephone 10 has migrated to a position of the mobile telephone 10d in the vicinity of a stand shown in FIG. 25 will be explained. Additionally, in this example, it is assumed that the mobile telephone 10 migrates to a region, in which an area of the function control information transmitter 30c and an area of the function control information transmitter 30d are overlapped with each other, out of the area of the function control information transmitter 30d, and the mobile telephone 10 can receive both of the function control information 40-c and the function control information 40-d.

The cancellation manager 19 of the mobile telephone 10 regularly detects whether or not the state of the mobile telephone 10 is equivalent to the condition of the cancellation information 46, which the storage section 20 stores, at a predetermined time period (step S102a). In a case where it is equivalent to the condition of the cancellation information 46 (it has been determined that the condition is met), the cancellation manager 19 cancels an execution of the function control (step S102b).

In this example, the storage section 20 has stored the cancellation information 46 "after four hours" of the function control information 40-a, and the cancellation information 46

"the function control information 40-*c* has not been received" of the function control information 40-*c*. The mobile telephone 10 can receive the function control information 40-*c* in a location of the mobile telephone 10*d* shown in FIG. 25, whereby the cancellation manager 19 determines that the condition of the cancellation information 46 of the function control information 40-*c* is not met, and continues the function control of the function control information 40-*c*. Additionally, in this example, an operation will be explained on the assumption that four hours have not elapsed since an execution of the function control by the function control information 40-*a* and the function control by the function control information 40-*a* has not been cancelled.

When the mobile telephone 10 enters the communication area of the function control information transmitter 30*c* and the function control information transmitter 30*d* (step S102), the reception section 11 of the mobile telephone 10 employs communication means other than the communication means that is employed for making a call, thereby to receive the function control information 40-*c* and the function control information 40-*d* (step S103). The function control information 40-*c* has already been function-controlled, whereby the reception section 11 causes the storage section 20 to store the received function control information 40-*d*. And, the mobile telephone 10 performs a process for the function control information 40-*d*.

The credibility confirmer 16 verifies credit information 43 "a sender of the function control information 40-*d*: a signature of a ΔΔ stand", thereby to determine whether or not the credit information 43 is valid (step S103*a*). Specifically, the credibility confirmer 16 employs a public key encryption technology etc. to authenticate the credit information 43 based upon an encryption key corresponding to "sender: of a ΔΔ stand" that the storage section 20 stores, and verifies existence of the tampering of the sender and the content of the function control information 40-*d*. In a case where the credibility confirmer 16 has failed in the authentication and has determined that a verification result is not correct, the mobile telephone 10 scraps the function control information 40-*d* (step S106).

When the credibility confirmer 16 determines that a verification result is correct, the situation analyzer 17 determines and verifies whether or not the state of the mobile telephone 10 meets the execution condition 44 of the function control information 40 (step S103*d*). In this example, as shown in FIG. 27, the execution condition 44 of the function control information 40-*d* is that "the application software for settling an account has been mounted". Upon inquiring of the monitor 13, the situation analyzer 17 receives the effect that the application software for settling an account has been mounted. Accordingly, in this example, the situation analyzer 17 determines that the state of the mobile telephone 10 meets the condition. Additionally, in a case where the condition is not met in the step S103*b*, the mobile telephone 10 scraps the function control information 40-*d* (step S106).

When the situation analyzer 17 determines that the execution condition 44 is met, the adjuster 12 specifies the control object function (step S104). In this example, the adjuster 12 specifically decides that the control object function is a function of starting the application software for settling an account based upon the function control information 40-*d* shown in FIG. 27. And, by inquiring of the monitor 13, the adjuster 12 determines whether or not the application software for settling an account is startable (step S105). In this example, the adjuster 12 determines that the application software for settling an account is startable.

Next, the situation analyzer 17 compares the priority degree 42 of the function control information 40-*d* with the priority degree of the current control source of the control object function (step S107*a*). In this embodiment, the monitor 13 causes the storage section 20 to store the control source of each function. Further, the storage section 20 has stored a relation as well between the priority degree of the control source and the priority degree 42 of the function control information 40. In this example, the application software for settling an account is in a state of having not been started yet elsewhere, whereby the storage section 20 has not stored the current control source of the start function of the application software for settling an account. For this, the situation analyzer 17 determines that the priority degree 42 of the function control information 40-*d* is higher than the priority degree of the current control source. Thus, the situation analyzer 17 determines that the function control by the function control information 40-*d* is possible.

When the situation analyzer 17 determines that all of the function control contents 41 of the function control information 40-*d* are controllable, the mobile telephone 10 displays an icon of a ΔΔ stand d based upon the icon information 48 (step S107*b*), and notifies the effect that the function control information 40-*d* has been received to the user.

Next, the compulsory force determinator 18 inquires of the storage section 20 a process content corresponding to the compulsory force 45 of the function control information 40-*d*. In this case, the compulsory force determinator 18 determines whether or not the value of the compulsory force 45 is "compulsory" (step S107*c*). In this example, the value of the compulsory force is "normal", whereby the mobile telephone 10 displays the effect that an input instruction for permission/refusal of an execution of the function control is urged, and inquires of the user of the mobile telephone 10 whether or not an execution of the function control is permitted. The mobile telephone 10 determines whether or not an input instruction for permitting an execution has been given by the user (step S107*d*). In a case where the user does not permit an execution of the function control (it has been determined that an input instruction for permitting an execution has not been given), the mobile telephone 10 scraps the function control information 40-*d* (step S106)

In a case where the user has permitted an execution of the function control (it has been determined that an input instruction for permitting an execution has been given), the cancellation manager 19 causes the storage section 20 to store the cancellation information 46 "while the function control information 40-*d* is received" of the function control information 40-*d* (step S107*e*).

And, the mobile telephone 10 controls the control object function (step S108 and step S109). In this case, the mobile telephone 10 starts the application software for settling an account. Further, the monitor 13 causes the storage section 20 to store the control source having activated the function (step S110). In this case, the monitor 13 causes the storage section 20 to store the priority degree 42 "low" as the control source. Additionally, in this case, in the mobile telephone 10, the function controls by the function control information 40-*a*, the function control information 40-*c*, and the function control information 40-*d* are validly operating.

Next, an operation in the case that the mobile telephone 10 has migrated to a position of the mobile telephone 10*e* in the vicinity of a gateway in FIG. 25 will be explained. The cancellation manager 19 of the mobile telephone 10 regularly detects whether or not the state of the mobile telephone 10 is equivalent to the condition of the cancellation information 46, which the storage section 20 stores, at a predetermined time period (step S102a). In a case where the cancellation manager 19 has determined that the state of the mobile telephone 10 is equivalent to the condition of the cancellation information 46 (the state of the mobile telephone 10 meets the condition), it cancels an execution of the function control (step S102b).

In this example, the storage section 20 has stored the cancellation information 46 "after four hours" of the function control information 40-a, the cancellation information 46 "the function control information 40-c has not been received" of the function control information 40-c,, and the cancellation information 46 "the function control information 40-d has not been received" of the function control information 40-d. The mobile telephone 10 cannot receive the function control information 40-c and the function control information 40-d in a location of the mobile telephone 10e shown in FIG. 25, whereby the cancellation manager 19 cancels the function control by the function control information 40-c and the function control information 40-d.

That is, the mobile telephone 10 cancels the setting of prohibiting the camera photographing, cancels the setting of the non-lighting, and ends the application software for settling an account. Further, the mobile telephone 10 erases an icon display of a ○○ movie theater c and a △△ stand d, and erases the function control information 40-c and the function control information 40-d stored in the storage section 20. Additionally, if it is assumed that four hours have not elapsed since an execution of the function control by the function control information 40-a, the mobile telephone 10 does not erase the manner mode setting by the function control information 40-a.

When the mobile telephone 10 enters the communication area of the function control information transmitter 30e (step S102), the reception section 11 of the mobile telephone 10 employs communication means other than the communication means that is employed for making a call, thereby to receive the function control information 40-e from the function control information transmitter 30e (step S103). And, the reception section 11 causes the storage section 20 to store the received function control information 40-e.

The credibility confirmer 16 verifies credit information 43 "a sender of the function control information 40-e: a signature of a ○○ movie theater", thereby to determine whether or not the credit information 43 is valid (step S103a). Specifically, the credibility confirmer 16 employs a public key encryption technology etc. to authenticate the credit information 43 based upon an encryption key corresponding to "sender: a ○○ movie theater" that the storage section 20 stores, and verifies existence of the tampering of the sender and the content of the function control information 40-e. In a case where the credibility confirmer 16 has failed in the authentication and has determined that a verification result is not correct, the mobile telephone 10 scraps the function control information 40-e (step S106).

When the credibility confirmer 16 determines that a verification result is correct, the situation analyzer 17 determines and verifies whether or not the state of the mobile telephone 10 meets the execution condition 44 of the function control information 40 (step S103d). In this example, as shown in FIG. 27, the execution condition 44 of the function control information 40-e is that "the function control information 40-a has been executed". Upon inquiring of the monitor 13, the situation analyzer 17 receives the effect that the function control information 40-a has been executed. Accordingly, in this example, the situation analyzer 17 determines that the state of the mobile telephone 10 meets the condition. Additionally, in a case where the condition is not met in the step S103b, the mobile telephone 10 scraps the function control information 40-e (step S106).

When the situation analyzer 17 determines that the execution condition 44 is met, the adjuster 12 specifies the control object function (step S104). In this example, the adjuster 12 specifically decides that the control object function is a function of canceling the manner mode, a function of deleting an execution record of the function control information 40-a, and a function of distributing a discount ticket for a next-time movie show based upon the function control information 40-e shown in FIG. 27. And, by inquiring of the monitor 13, the adjuster 12 determines whether or not a cancellation of the manner mode, a delete of an execution record of the function control information 40-a and a distribution of a discount ticket for a next-time movie show are possible (step S105). In this example, the adjuster 12 determines that any of a cancellation of the manner mode, a delete of an execution record of the function control information 40-a, and a distribution of a discount ticket for a next-time movie show is possible.

Next, the situation analyzer 17 compares the priority degree 42 of the function control information 40-e with the priority degree of the current control source of the control object function (step S107a). In this embodiment, the monitor 13 has caused the storage section 20 to store the control source of each function. Further, the storage section 20 has stored a relation as well between the priority degree of the control source and the priority degree 42 of the function control information 40. In this example, the situation analyzer 17 determines that the priority degree 42 "high" of the function control information 40-e is higher than the priority degree "low" of the current control source of the manner mode setting function. Further, in this example, the storage section 20 has stored the priority degree "low" as the current control source of "an execution record of the function control information 40-a". For this, the situation analyzer 17 determines that the priority degree 42 "high" of the function control information 40-e is higher than the priority degree "low" of the current control source.

Further, the application software for distributing a discount ticket of a net-time movie show is in a state of having not been started yet elsewhere, whereby the storage section 20 has not stored the current control source of the start function of the application software. For this, the situation analyzer 17 determines that the priority degree 42 of the function control information 40-e is higher than the priority degree of the current control source. Thus, the situation analyzer 17 determines that the function control by the function control information 40-e is possible.

When the situation analyzer 17 determines that all of the function control contents 41 of the function control information 40-e are controllable, the mobile telephone 10 displays an icon of a ○○ movie theater e based upon the icon information 48 (step S107b), and notifies the effect that the function control information 40-e has been received to the user.

Next, the compulsory force determinator 18 inquires of the storage section 20 a process content corresponding to the compulsory force 45 of the function control information 40-e. In this case, the compulsory force determinator 18 determines whether or not the value of the compulsory force 45 is "compulsory" (step S107c). In this example, the value of the compulsory force is "compulsory", whereby the mobile telephone 10 determines that a permission for executing the function control has not to be obtained from the user of the mobile telephone 10.

The mobile telephone 10 controls the control object function without obtaining an input instruction for permission by the user (step S108 and step S109). In this case, the mobile telephone 10 cancels the manner mode setting, deletes an execution record of the function control information 40-*a* from the storage section 20, and erases the icon display of a ○○ movie theater a. Further, the mobile telephone 10 erases the function control information 40-*a* stored in the storage section 20, and causes the storage section 20 to store a discount ticket for a next-time movie show. Further, the monitor 13 causes the storage section 20 to store the control source having activated the function (step S110). In this case, canceling the manner mode setting, and deleting the execution record of the function control information 40-*a* allow the state of the mobile telephone 10 to return to the initial state, whereby the monitor 13 causes the storage section 20 to store the priority degree "no" as the control source.

The mobile telephone 10, which has returned to the initial state, being the state prior to arriving at the movie theater at the first time, is in a state of having preserved the discount ticket in the storage section 20 having a discount ticket for a next-time movie show distributed. Thereafter, when the mobile telephone 10 migrates to a location in which the function control information 40-*e* cannot be received, it cancels the function control by the function control information 40-*e*. Additionally, at the stage that the state of the mobile telephone 10 has returned to the initial state, the mobile telephone 10 erases the icon display of a ○○ movie theater e, and erases only the function control information 40-*e* stored in the storage section 20.

As mentioned above, when the mobile telephone 10 sequentially migrates from a position of the mobile telephone 10*a* up to a position of the mobile telephone 10*e* shown in FIG. 25, the mode is set to the manner mode at an entrance of a movie theater, the electric ticket application software thereof is automatically started in a ticket barrier, the prohibition of the camera photographing and the non-lighting of the backlight of the liquid crystal are automatically set in a seat, the application software for a process of settling an account thereof is automatically started in a stand, and the state is returned to the original state when it leaves the movie theater. Such a system makes it possible to easily utilize the function of the mobile telephone 10 that is adapted to the situation even though the user does not think about an operation of the mobile telephone 10.

As mentioned above, in accordance with this embodiment, the terminal device (the mobile telephone 10) includes the situation analyzer 17 for deciding the order of the function control process based upon the execution order of controllable function, and the evaluation information indicating validity of the function control information 40. Accordingly, this embodiment enables the valid process to be antecedently performed also in a case of having received plural kinds of the function control information 40.

Further, this embodiment allows the control source having activated the function, the application software and the service, and the function control information 40 to have a control intensity affixed. Further, the terminal device includes the adjustment means (adjuster 12) for, in a case where there exists the function control information 40 that competes with the function, being a control object, inquiring of the monitoring means (monitor 13) the control intensity of the control source that is currently controlling its function, being a control object, in some cases, and making a comparison with the control intensity of the other function control information 40 in some cases, thereby to determine propriety of the process. Accordingly, the valid process can be performed also in a case of having plural kinds of the function control information 40 for one function.

SUSCEPTIBLE OF INDUSTRIAL APPLICATION

The external request type function control system in accordance with the present invention can be put into practical use for the mobile terminal such as the mobile telephone, a PHS (Personal Handyphone System), a PDA, and a machine having a car navigation system mounted. Putting the present invention into practical use makes it possible to easily utilize the function of the mobile terminal that is adapted to the situation even though the user does not operate the mobile terminal.

The invention claimed is:

1. An external request type function control program for allowing a function of a terminal device to be controlled, characterized in causing a computer to execute the processes of:
    receiving function control information including an instruction for controlling a function of said terminal device, said function control information being transmitted by an external function control information transmitting device of the terminal device;
    monitoring a state of the function that could be specified in said function control information and storing a control source, being a cause of having changed a state of the function into a current state;
    based upon said monitoring result, comparing a priority degree of the current control source of the function specified in the function control information, out of said stored control sources, with a priority degree that is included in said function control information, thereby to determine whether or not the function control by said function control information is executable; and
    based upon said determination result, controlling said function of said terminal device.

2. The external request type function control program according to claim 1, characterized in causing the computer to execute the processes of:
    determining whether or not the function control information transmitting device, being a transmission source that has transmitted the function control information, and a transmission source described in said function control information coincide with each other, and determining existence of tampering of said function control information; and
    controlling the function of the terminal device based upon said determination result.

3. The external request type function control program according to claim 1, characterized in causing the computer to execute the processes of:
    determining whether or not a state of the terminal device meets a condition under which the function control described in the function control information is executed; and
    controlling said function of said terminal device based upon said determination result.

4. The external request type function control program according to claim 1, characterized in causing the computer to execute the process of, based upon evaluation information described in the function control information, deciding whether or not a permission for executing the function control is requested of a user of the terminal device.

5. The external request type function control program according to claim 1, characterized in causing the computer to execute the process of, in a case of having received plural kinds of the function control information, deciding an order in which a function control process is executed based upon evaluation information described in said function control information.

6. The external request type function control program according to claim 1, characterized in causing the computer to execute the processes of:
pre-storing an execution order of the executable function; and
in a case of having received plural kinds of the function control information, deciding an order in which a function control process is executed based upon said stored execution order of said function.

7. The external request type function control program according to claim 1, characterized in causing the computer to execute the processes of:
pre-storing an execution order of the controllable function; and
in a case of having received plural kinds of the function control information, deciding an order in which a function control process is executed based upon said stored execution order of said function and evaluation information described in said function control information.

* * * * *